United States Patent …

Johnsen et al.

(10) Patent No.: US 10,924,432 B2
(45) Date of Patent: *Feb. 16, 2021

(54) SYSTEM AND METHOD FOR FABRIC LEVEL VERIFICATION OF HOST DEFINED PORT GUIDS IN A HIGH PERFORMANCE COMPUTING NETWORK

(71) Applicant: ORACLE INTERNATIONAL CORPORATION, Redwood Shores, CA (US)

(72) Inventors: Bjørn Dag Johnsen, Oslo (NO); Harald Høeg, Oslo (NO); Dag Georg Moxnes, Oslo (NO); Line Holen, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/847,618

(22) Filed: Dec. 19, 2017

(65) Prior Publication Data

US 2018/0234356 A1 Aug. 16, 2018

Related U.S. Application Data

(60) Provisional application No. 62/457,585, filed on Feb. 10, 2017.

(51) Int. Cl.
H04L 12/933 (2013.01)
H04L 12/931 (2013.01)

(52) U.S. Cl.
CPC ............ H04L 49/15 (2013.01); H04L 49/358 (2013.01); H04L 49/70 (2013.01)

(58) Field of Classification Search
None
See application file for complete search history.

(56) References Cited

U.S. PATENT DOCUMENTS

| | | | |
|---|---|---|---|
| 9,658,779 B2* | 5/2017 | Kawakami | G06F 3/06 |
| 9,860,116 B1* | 1/2018 | Jain | H04L 41/0806 |
| 2004/0030763 A1* | 2/2004 | Manter | H04L 41/044 709/223 |
| 2012/0284712 A1* | 11/2012 | Nimmagadda | G06F 9/5077 718/1 |
| 2013/0125112 A1* | 5/2013 | Mittal | G06F 9/45558 718/1 |
| 2016/0380865 A1* | 12/2016 | Dubal | H04L 41/046 709/224 |

* cited by examiner

Primary Examiner — Noel R Beharry
Assistant Examiner — Rodrick Mak
(74) Attorney, Agent, or Firm — Tucker Ellis LLP

(57) ABSTRACT

Systems and methods can provide for fabric level verification of host defined port GUIDs in a high performance computing network. A lightweight scheme for fabric level verification of host defined port GUIDs is provided wherein a virtual machine is assigned a set of GUIDs that travel with the virtual machine, even on migration or re-start.

17 Claims, 16 Drawing Sheets

```
┌─────────────────────────────────────────────────────────────┐
│ Provide, at one or more computers, including one or more    │
│ microprocessors, a first subnet, the first subnet comprising one or more │
│ switches, the one or more switches comprising at least a leaf switch, │
│ wherein each of the one or more switches comprise a plurality of switch │
│ ports, a plurality of host channel adapters, wherein each of the host │
│ channel adapters comprise at least one virtual function, at least one │
│ virtual switch, and at least one physical function, and wherein the │
│ plurality of host channel adapters are interconnected via the one or │
│ more switches, a plurality of hypervisors, wherein each of the plurality of │         ~1310
│ hypervisors are associated with at least one host channel adapter of the │
│ plurality of host channel adapters, a plurality of virtual machines, │
│ wherein each of the plurality of virtual machines are associated with at │
│ least one virtual function, and a subnet manager, the subnet manager │
│ running on one of the one or more switches and the plurality of host │
│ channel adapters.                                           │
└─────────────────────────────────────────────────────────────┘
                              │
                              ▼
┌─────────────────────────────────────────────────────────────┐
│ Configure a switch port of the plurality of switch ports on a switch of the │         ~1320
│ one or more switches as a router port.                      │
└─────────────────────────────────────────────────────────────┘
                              │
                              ▼
┌─────────────────────────────────────────────────────────────┐
│ Logically connect the switch port configured as the router port is to a │
│ virtual router, the virtual router comprising at least two virtual router │         ~1330
│ ports.                                                      │
└─────────────────────────────────────────────────────────────┘
```

FIGURE 13

SYSTEM AND METHOD FOR FABRIC LEVEL VERIFICATION OF HOST DEFINED PORT GUIDS IN A HIGH PERFORMANCE COMPUTING NETWORK

CLAIM OF PRIORITY

This application claims the benefit of priority to U.S. Provisional Application titled "SYSTEM AND METHOD FOR FABRIC LEVEL VERIFICATION OF HOST DEFINED PORT GUIDS IN AN INFINIBAND NETWORK", application Ser. No. 62/457,585, filed on Feb. 10, 2017.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to fabric level verification of host defined port GUIDs (global unique identifiers) in a network environment.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein are systems and methods for fabric level verification of host defined port GUIDs in a high performance computing environment, such as an InfiniBand™ network, in accordance with an embodiment.

In accordance with an embodiment, an exemplary method is provided for fabric level verification of host defined port GUIDs in a high performance computing environment.

BRIEF DESCRIPTION OF THE FIGURES

FIG. 13 shows a flowchart of a method for supporting dual-port virtual router in a high performance computing environment, in accordance with an embodiment.

DETAILED DESCRIPTION

Figure 1:
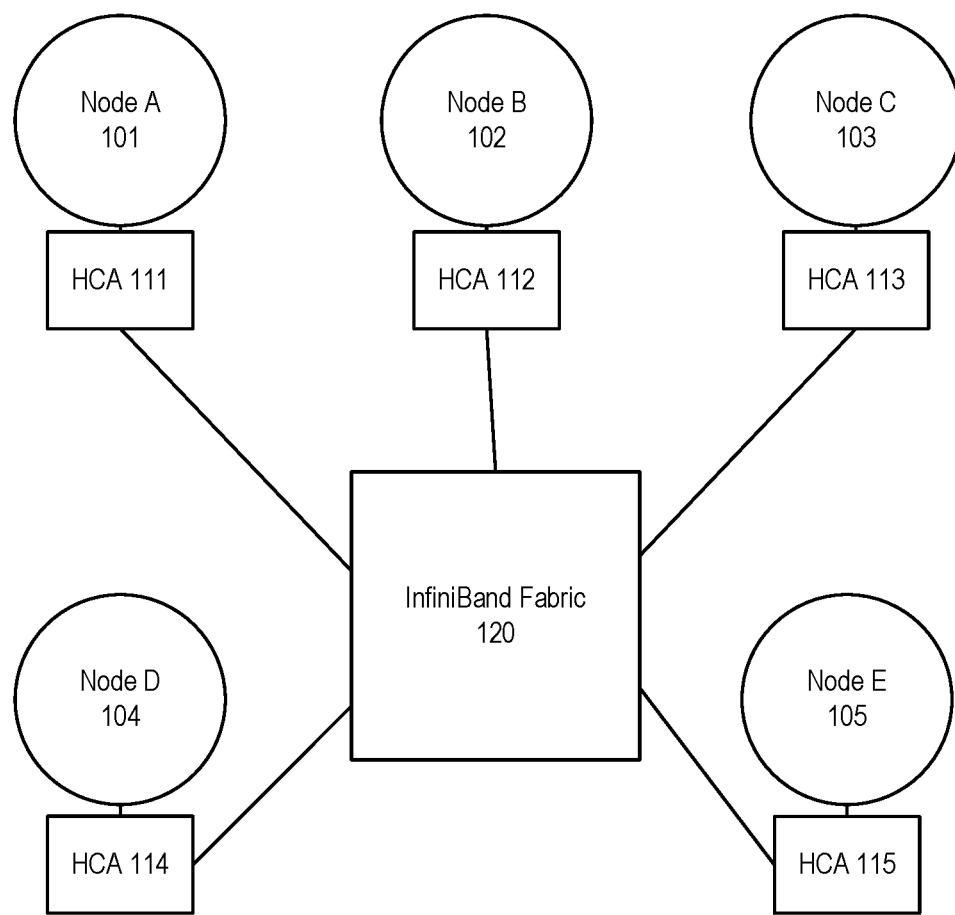
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for fabric level verification of host defined port GUIDs in a high performance computing environment, such as an InfiniBand™ network, in accordance with an embodiment.

The following description of the invention uses an InfiniBand™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation, such as, for example, a RoCE fabric (RDMA over Converged Ethernet).

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
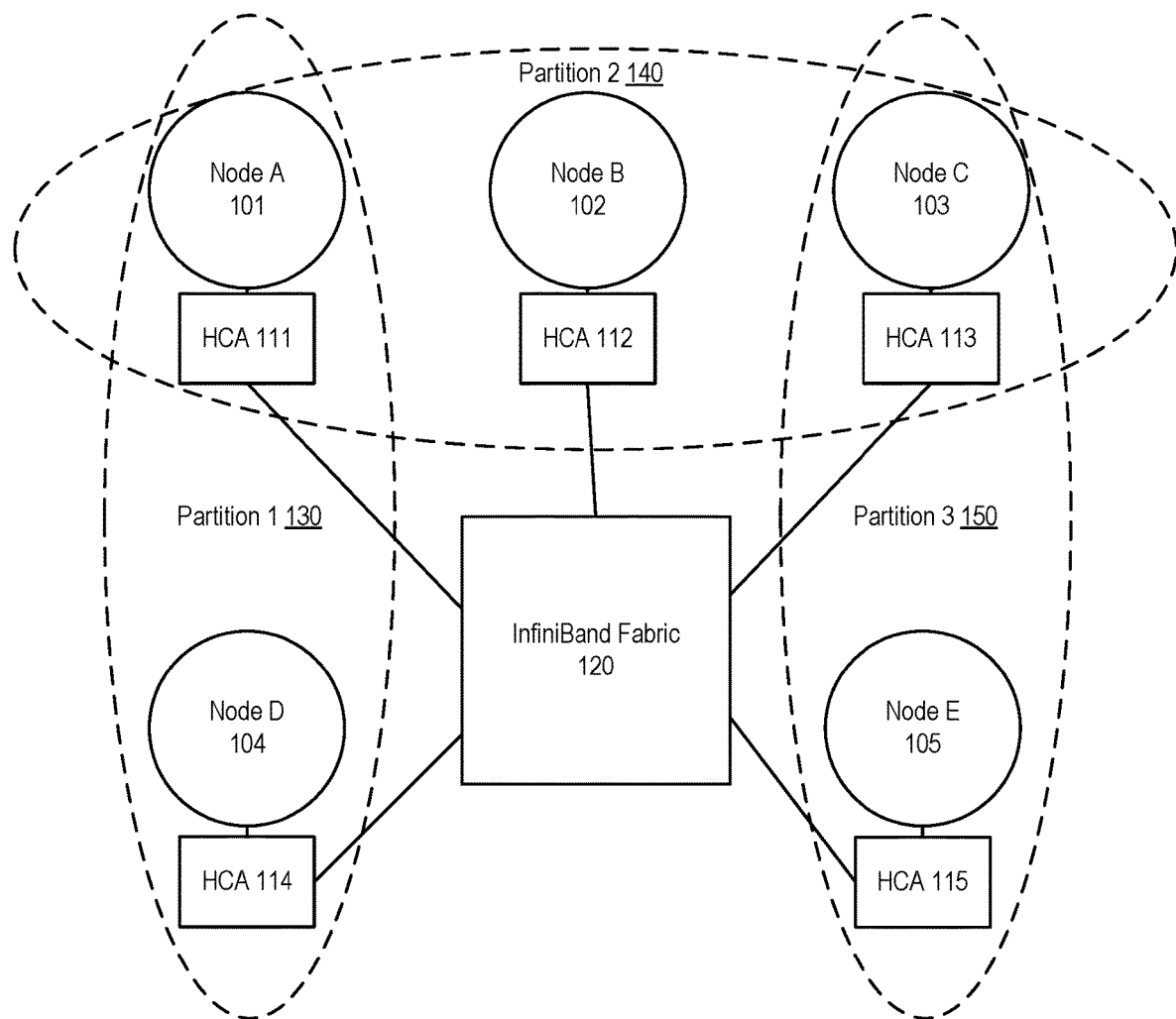
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
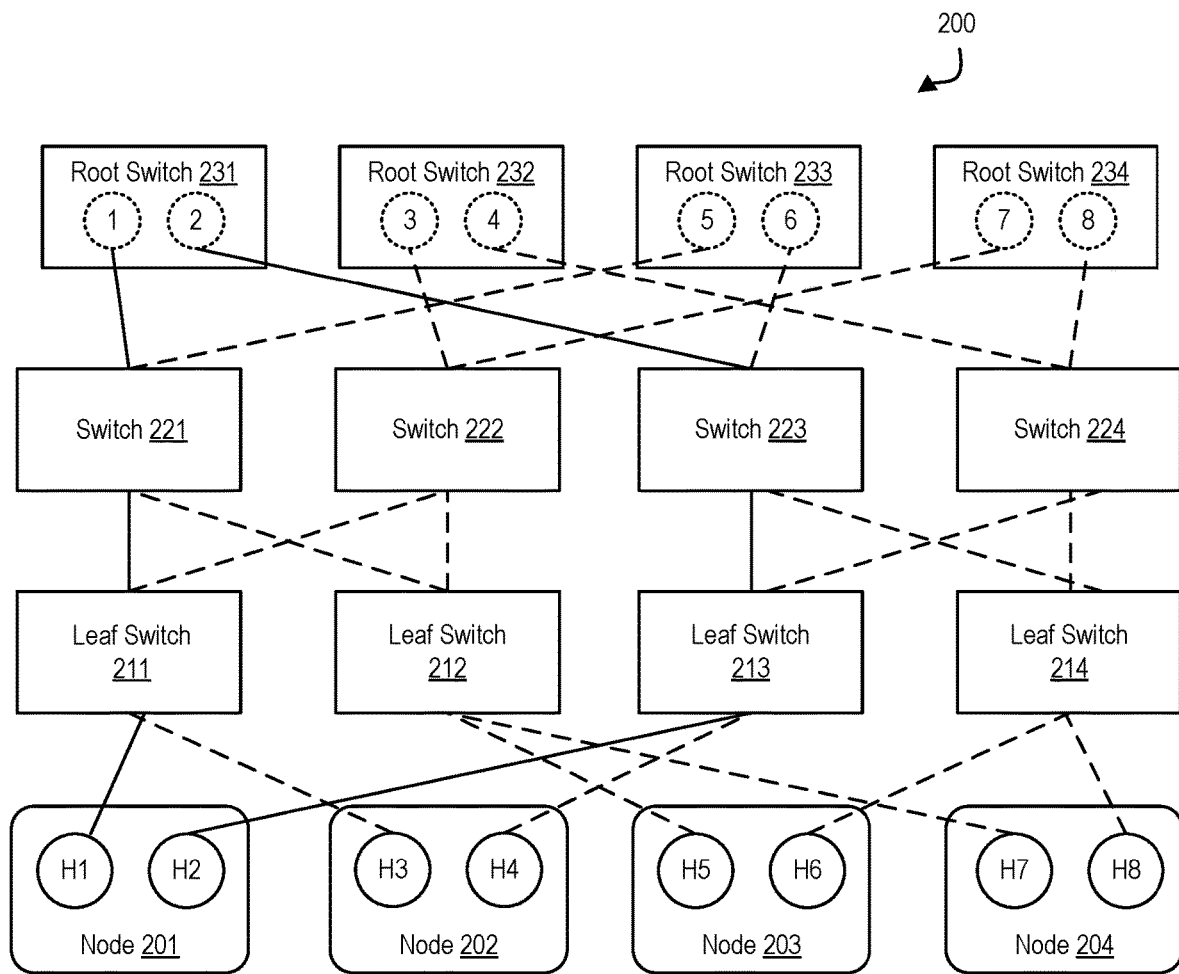
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
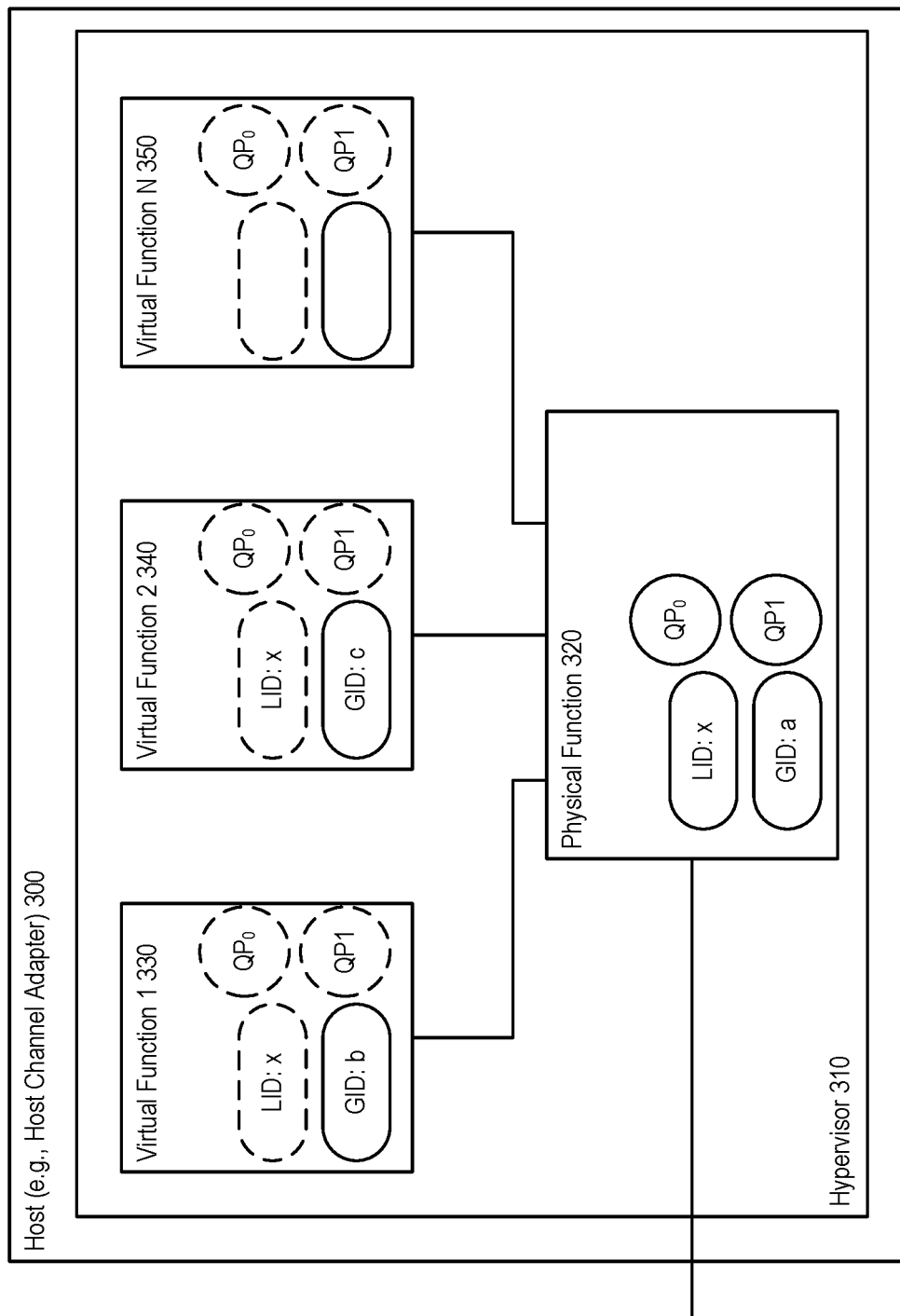
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
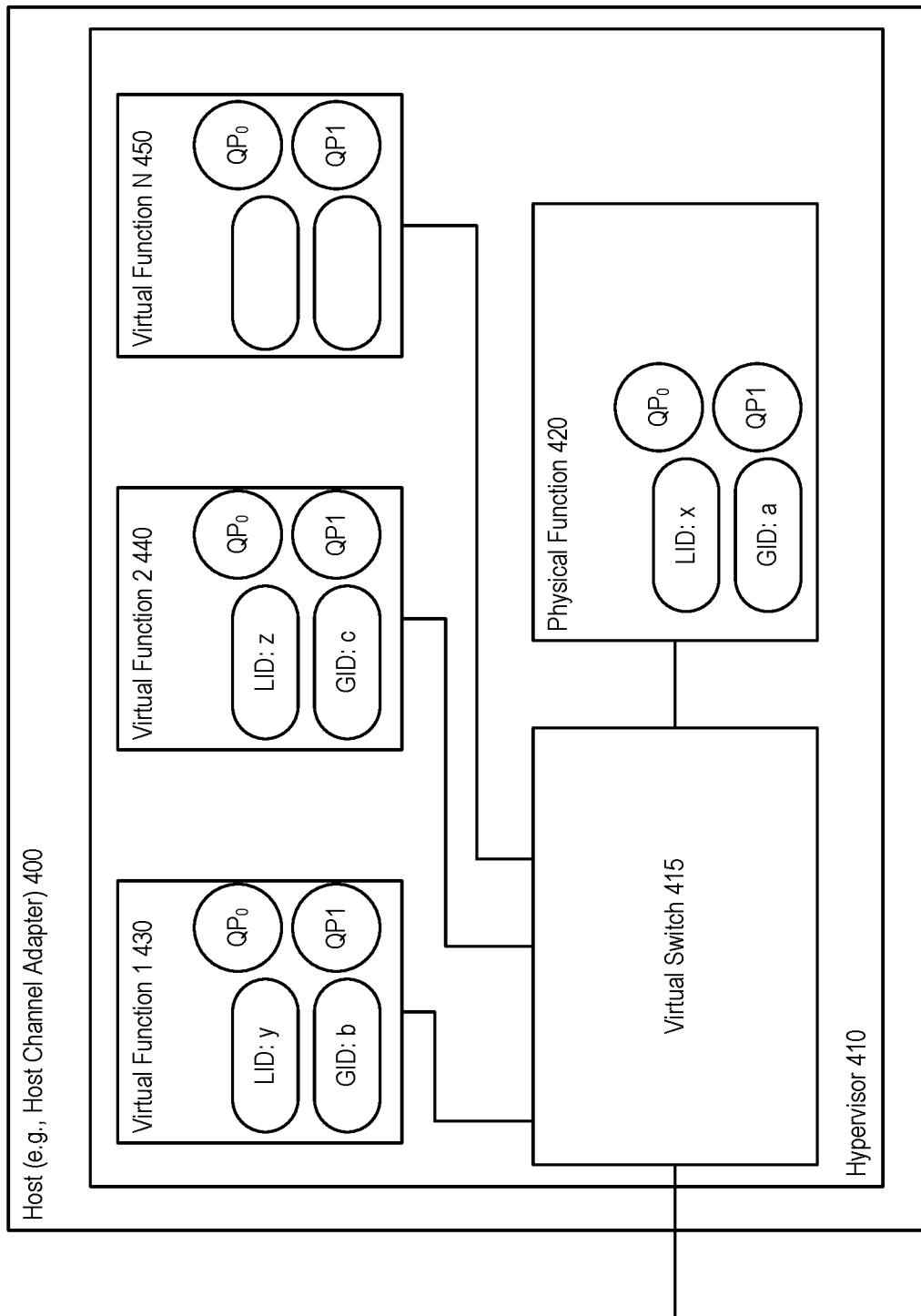
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
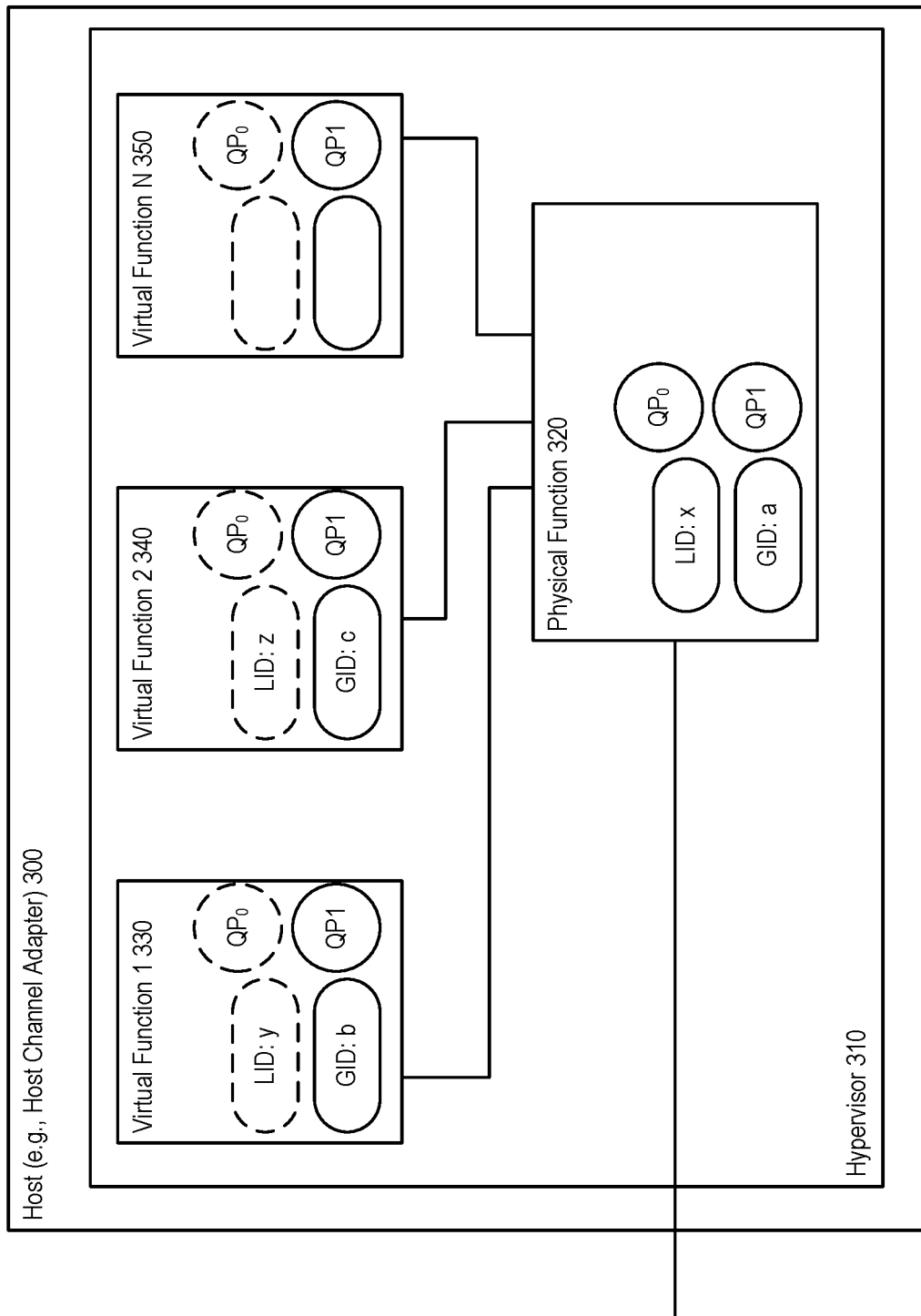
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
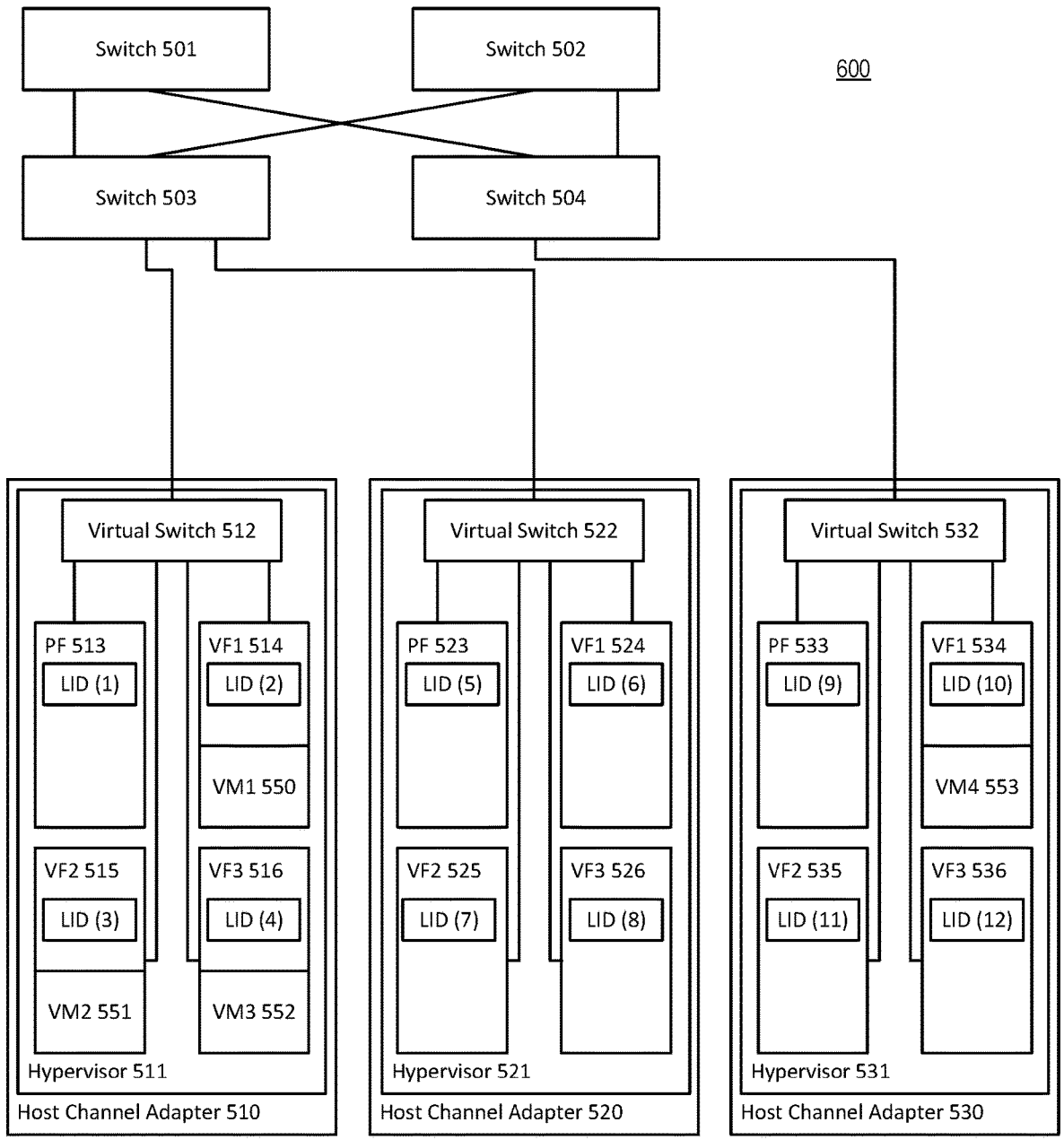
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 5, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 5.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
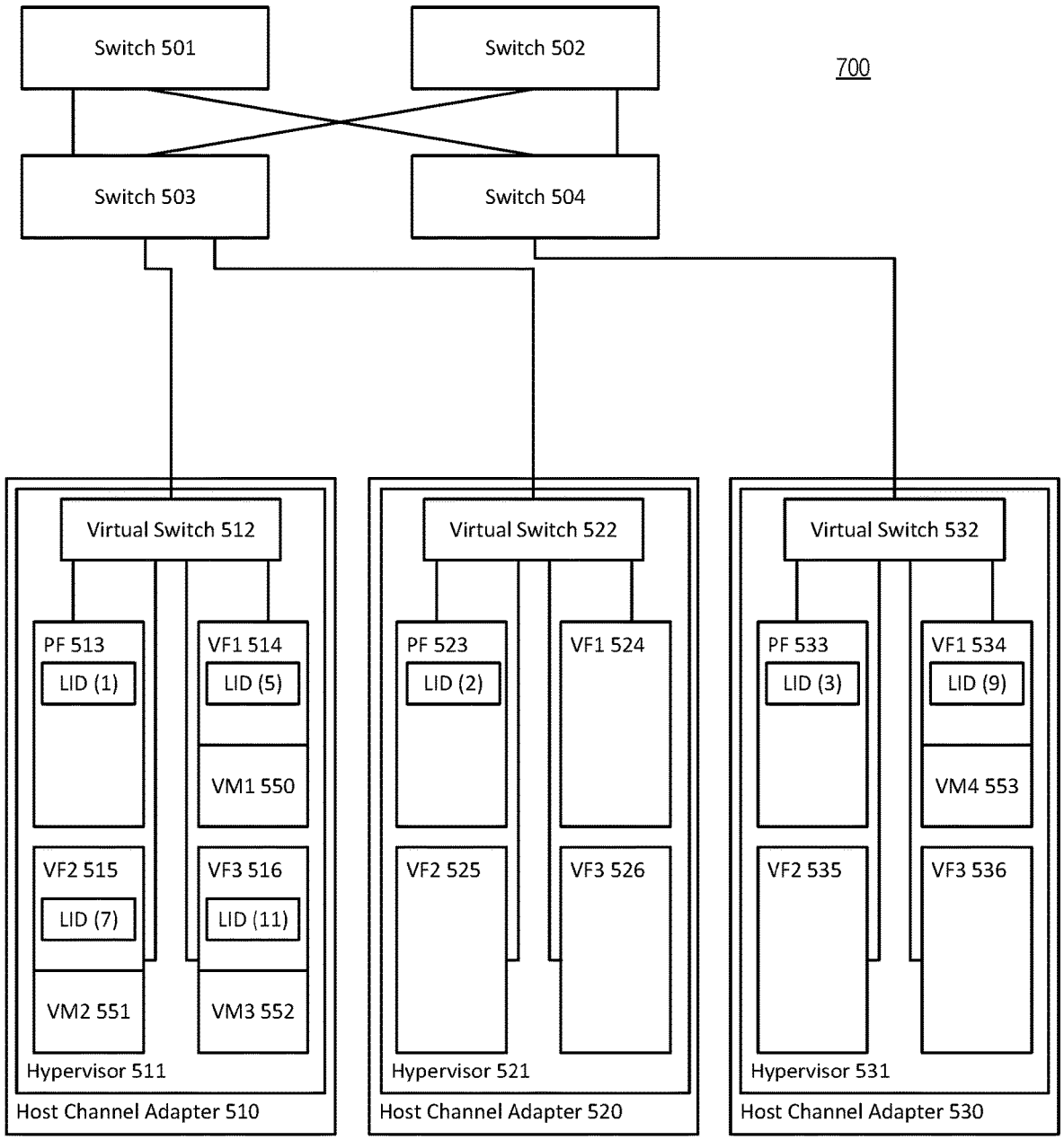
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 7, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
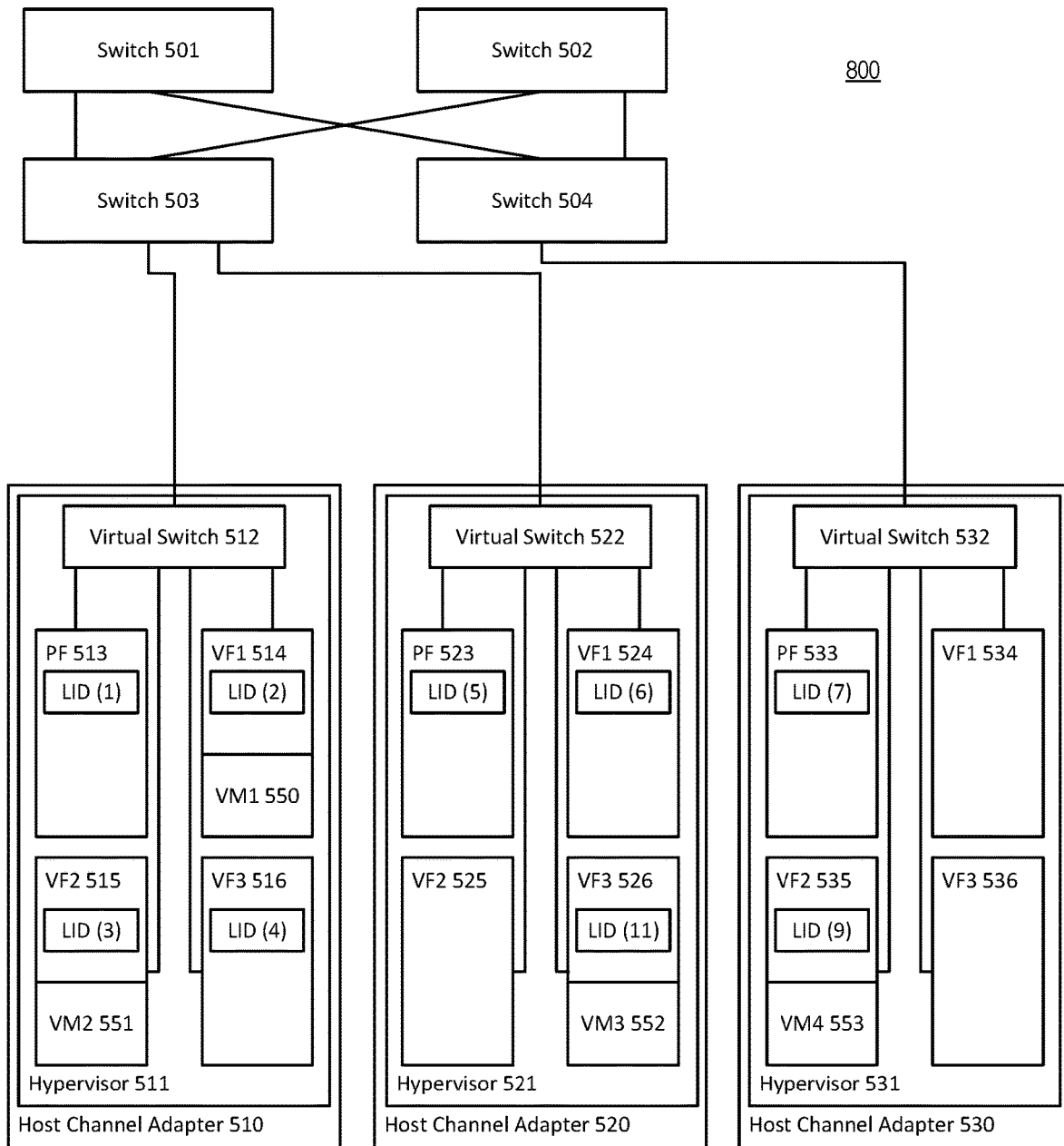
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 7, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 8, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
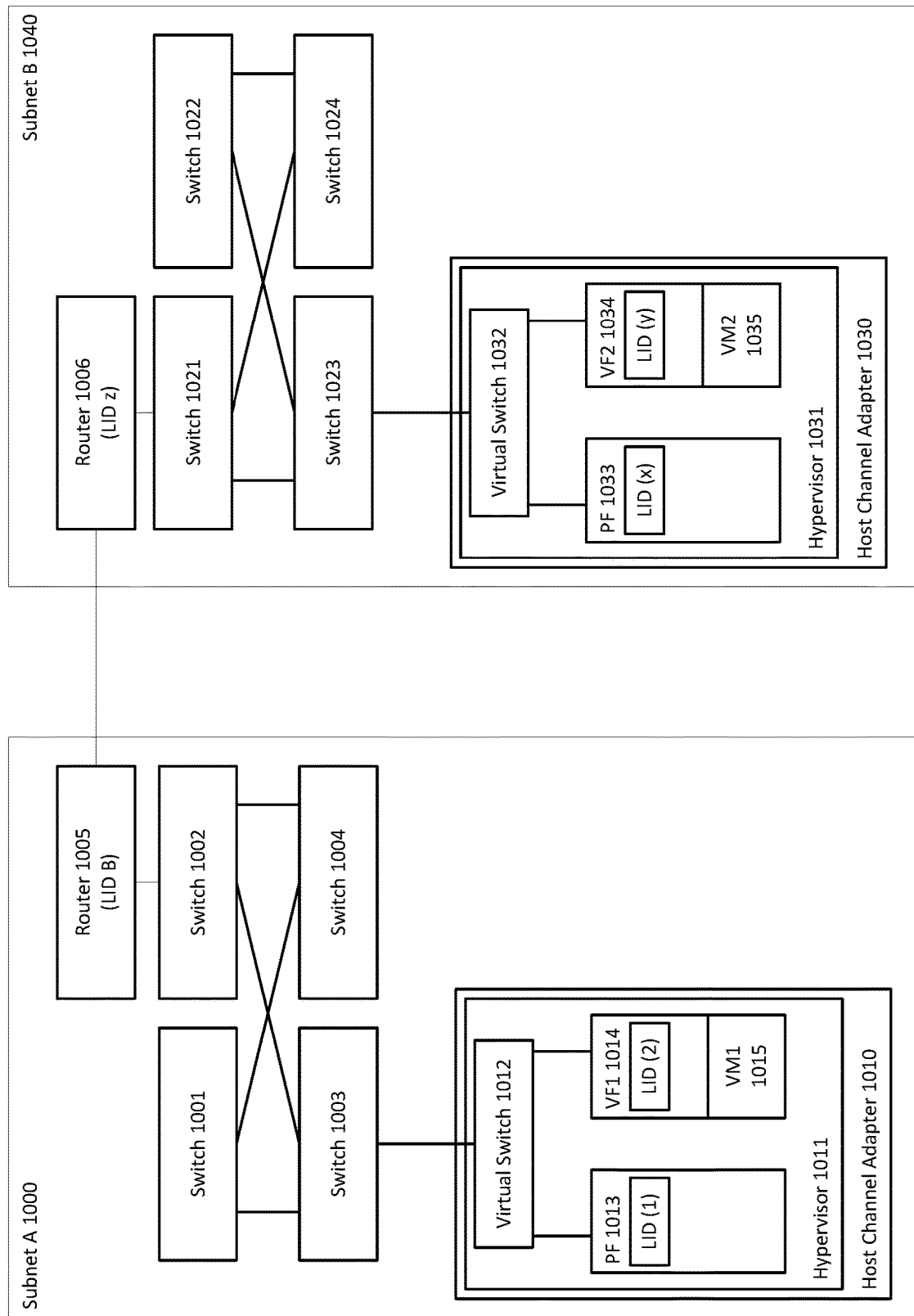
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapters 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 10105 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet b 1040 (e.g., an IB subnet) between members of a fabric, such as an InfiniBand fabric. The fabric can include a number of hardware devices, such as, for example, channel adapter 1030. Host channel adapters 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, created a fabric profile (e.g., a virtual machine fabric profile), build a virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination at a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
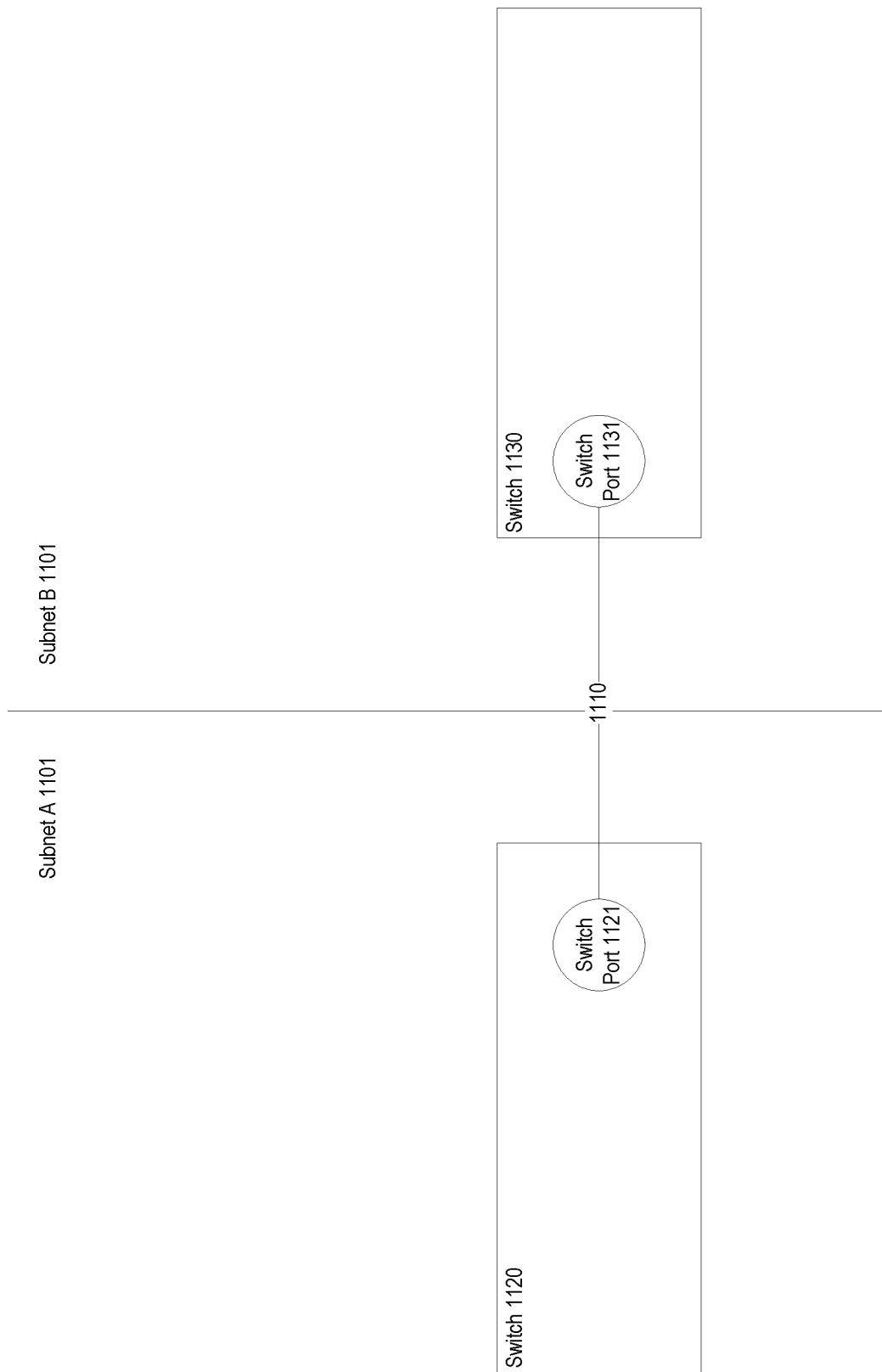
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnetA 1101 can be connected through a switch port 1121 of switch 1120, via a physical connection 1110, to a switch 1130 in subnet B 1102, via a switch port 1131 of switch 1130. In such an embodiment, each switch port, 1121 and 1131, are acting both as switch ports and router ports.

In accordance with an embodiment, a problem with this configuration is that a management entity, such as a subnet manager in an InfiniBand subnet, cannot distinguish between a physical port that is both a switch port and a router port. In such a situation, SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
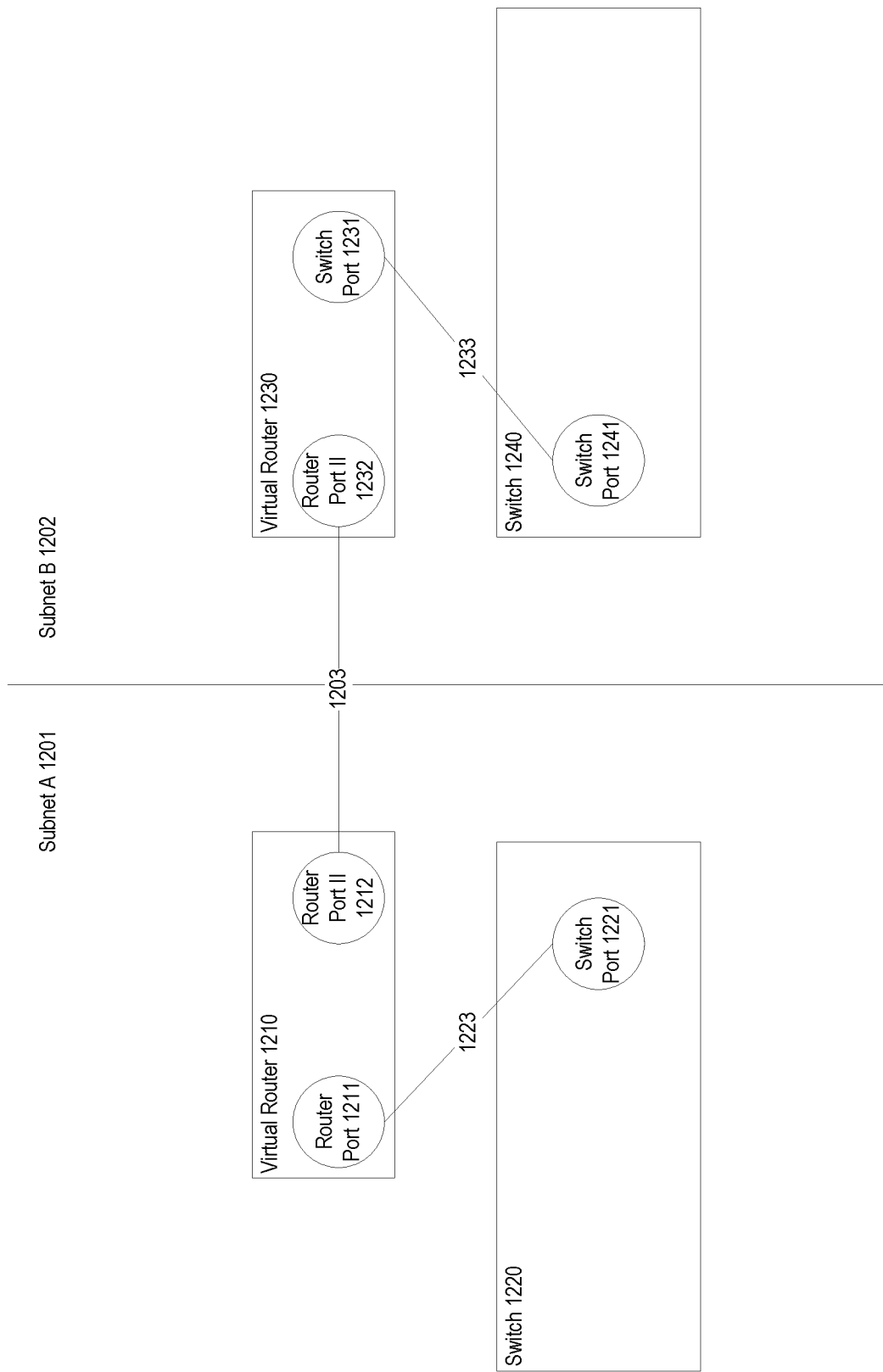
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnetA 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnetA 1201 via first end of the physical link with subnet B 1202 via a second end of the physical link, via router port II 1212 and router port II 1231, contained in virtual router 1230 in subnet B 1202. Virtual router 1230 can additionally comprise router port 1232, which can be connected (i.e., logically connected) to switch port 1241 on switch 1240 via a virtual ink 1233.

In accordance with an embodiment, a subnet manager (not shown) on subnet A can detect router port 1211, on virtual router 1210 as an end point of the subnet that the subnet manager controls. The dual-port virtual router abstraction can allow the subnet manager on subnet A want to deal with subnet A in a usual manner (e.g., as defined per the InfiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continued to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connect to some other switch port in the same subnet, or to a switch port that was not intended to provide a connection to another subnet. Therefore we also, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on a local side, a system does not have to provide an external, independent management entity. That is, each side of a subnet to subnet connection can be responsible for configuring its own dual-port virtual router.

In accordance with an embodiment, and additionally to the above, because each subnet is responsible for managing the local dual-port virtual router abstraction, each subnet manager is then also responsible and retains control over all data traffic within the subnet, including data traffic exiting the controlled subnet, and data traffic entering the subnet from a remote subnet.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

FIG. 13 shows a method for supporting dual-port virtual router in a high performance computing environment, in accordance with an embodiment. At step 1310, the method can provide at one or more computers, including one or more microprocessors, a first subnet, the first subnet comprising one or more switches, the one or more switches comprising at least a leaf switch, wherein each of the one or more switches comprise a plurality of switch ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, a plurality of virtual machines, wherein each of the plurality of virtual machines are associated with at least one virtual function, and a subnet manager, the subnet manager running on one of the one or more switches and the plurality of host channel adapters.

At step 1320, the method can configure a switch port of the plurality of switch ports on a switch of the one or more switches as a router port.

At step 1330, the method can logically connect the switch port configured as the router port is to a virtual router, the virtual router comprising at least two virtual router ports.

Fabric Level Verification of Host Defined Port GUIDs

In accordance with an embodiment, methods and systems can provided for fabric level verification of host defined port GUIDs.

There are currently three different Single Root I/O Virtualization (SRIOV) architectures supported within an InfiniBand network, as described above. These comprise a shared port model, a virtual switch model, and a virtual port model. Currently, a shared port model is a standard model, but runs into size constraints in the number of virtual machines each shared port host channel adapter can support.

However, no matter which SRIOV architecture is chosen, current Virtual Machine ID and Migration Manager and VM Fabric Profile based schemes are cumbersome and time consuming for systems that only require VM specific global unique identifiers (GUIDs) and partition membership, and do not required virtual I/O. Such systems still need to be supported on current and future network switched architectures, leading to a need for a more lightweight system for obtaining a VM's GUID. Such a lightweight system can comprise fabric level verification of host defined port GUIDs.

SRIOV and IB vHCA Models:

In accordance with an embodiment, HCAs can provide SRIOV support via a "shared port" vHCA model (see above) that implies that an SM sees a single physical HCA port, with associated Partition Table and (alias) GUID table.

In accordance with an embodiment, such HCAs may support a single Physical Function (PF) and up to 63 Virtual Functions (VFs). Both the GUID table and the P_Key table size is 128 entries. Another HCA implementation provides SRIOV support via the "virtual switch" (vSwitch) model that implies that the SM sees a (e.g., 34 port) switch associated with each physical HCA port and this switch has 33 virtual ports connecting up to 33 vHCA ports (i.e. the PF as well as up to 32 VFs). Each vHCA Port has a 2 entry GUID table (fixed) and an 8 entry P_Key table (when 32 VFs).

In accordance with an embodiment, next and future generation HCAs are expected to implement a vPort model. This model is equivalent to the vSwitch model in that each vPort (vHCA port) has a private GUID table and a private P_Key table. The vPort model differs from the vSwitch model in that there is no switch or any other explicit packet forwarding mechanism between the physical HCA port and the various vPorts The Shared Port Management Model:

In accordance with an embodiment, management of a "shared port" vHCA model can be based on that each vHCA port has been associated with at least one alias GUID that is defined based on the HW GUID associated with the physical HCA port and may also have an additional GUID that is associated with the VM using the vHCA.

In accordance with an embodiment, the "shared port" virtualization model implies that the hyper-privileged PF driver provides an abstract view of private vHCA ports with dedicated (virtual) GUID and P_Key tables to the vHCA driver in the VMs. These virtual tables contain entries that represents real entries in the physical port tables.

In accordance with an embodiment, the HCA shared port GUID table is large enough that both the PF and the VFs may use two GUIDs per vHCA port. On the other hand, the corresponding P_Key table size implies that only two "private" P_Keys can be ensured for each VF, which is often not sufficient for a VM. Hence, the management of the shared port P_Key table is based on that partition membership is set up for the physical HCA port based on the HW GUID of the physical port prior to assigning a new VM to use any associated vHCA, and the VM provisioning logic must then make sure that the combined partition membership of the working set of VMs sharing a particular physical HCA is never exceeding the 128 entry capacity of the physical P_Key table. That is, VMs can share physical partition table entries in the normal case, and the level of sharing/overlap defines how many VFs/vHCAs can be used and thereby how many VMs can be active at any point in time.

In accordance with an embodiment, the SM never relates to VMs and vHCAs. —The hyper-privileged PF driver is responsible for requesting setup of alias GUIDs for the physical port GUID table via SA requests, and based on this the vHCA port virtual GUID table is set up. Similarly, the vHCA virtual P_Key tables are set up by the PF driver based on associating P_Key values defined by the VM configuration policy with entries in the physical P_Key table containing the corresponding P_Key values. Hence, a single physical P_Key table entry can in principle be shared by all vHCAs.

The vSwitch Basic Management Model:

In accordance with an embodiment, with the vSwitch model, all vHCAs are directly visible to the SM and the SM can set up both alias GUIDs as well as P_Key tables explicitly for the individual vHCA ports. Also, both GUID and P_Key tables are private to each vHCA, hence there is no way that such HW resources can be shared by (or be dynamically assigned to) different VFs/VMs as in the shared port case. This implies that as a long as a VF/vHCA is available, a VM can always be provisioned on the relevant physical server and it can always have up to two GUIDs and eight P_Keys independently of whatever other VMs are using.

In accordance with an embodiment, by default, each vHCA port can have a HW specific GUID allocated (i.e., physical card/module), and when this is used, the vHCA can be managed just like any physical HCA.

The vPort Basic Management Model:

In accordance with an embodiment, a vPort model implies the same conceptual management model as the vSwitch model in the sense that a vHCA port (vPort) represents dedicated GUID and P_Key tables. The implementation of low level operations will be slightly different though.

Dynamic VM Provisioning and Use of VM Specific GUIDs:

In accordance with an embodiment, in order to use GUIDs as the basis for provisioning of partition membership, fabric I/O resources as well as authentication of the sender of IB packets with Global Router Header (GRH), it is critical that associations between host/VM and GUID(s) are correct and consistent, and that all GUIDs used in the IB fabric are unique within that IB fabric context.

In accordance with an embodiment, for physical servers without any VMs, the main operational issue is that servers and HCAs may be replaced with new HW that represents different HW specific GUIDs. Alternatively, a physical server can be re-purposed for a different use case that represents different policies.

In accordance with an embodiment, in the case of component replacements, it is important that all configuration policies that are associated with existing HW specific GUID(s) are updated to reflect the HW specific GUIDs associated with the new (replacement) HW components.

In accordance with an embodiment, in the case of re-purposing, the corresponding requirement is that all old policy is removed before new policy is added.

In accordance with an embodiment, for VMs, the situation is different since an important aspect of a VM is the ability to be migrated or restarted on different physical servers at different points in time. Hence, when HW specific GUIDs are used for identification of a VM, then it is critical that any such policy is updated whenever the VM is migrated to, or restarted on, a different physical server, or is assigned a different vHCA on the same server.

In accordance with an embodiment, a workaround for avoiding such dynamic re-configuration is to enforce a restriction that a specific VM can only be started on a particular physical server and using a specific set of vHCA instances on a specific set of physical HCAs.

In accordance with an embodiment, a more flexible approach is to use a scheme where the VM represents its own set of unique VM specific GUIDs and have these GUIDs be populated dynamically for a vHCA whenever a vHCA instance is assigned to a specific VM.

In accordance with an embodiment, in this case, no GUID related configuration policy needs to be updated whenever the VM/vHCA association(s) changes. However, the issue of ensuring unique, correct and consistent GUIDs throughout the IB fabric becomes more challenging.

Implementing VM Specific GUIDs for the vSwitch Based vHCA Model:

In accordance with an embodiment, there are two schemes for supporting provisioning of vHCAs to VMs and use VM specific GUIDs for the vSwitch model:

VM Fabric Profile (VFP) scheme.

Host based vGUID Range Assignment (HGRA) scheme.

The VM Fabric Profile (VFP) Scheme:

In accordance with an embodiment, a VM Fabric Profile scheme implies that a VM ID is associated with a range of GUIDs and that relevant partition membership is also associated with this VFP. Virtual 10 and other fabric resources can then also be associated with the VFP directly, or with specific GUIDs that belongs to the VFP.

In accordance with an embodiment, the VFP itself can be global for the whole IB fabric (subnet) in the sense that it is permitted for any physical server to deploy it. Alternatively it can be associated with an "admin partition" which implies that it can only be deployed on physical HCA port instances that are already members of the relevant admin partition.

In accordance with an embodiment, the definition of the VFP would take place in association with the creation/definition of the VM but requires only that the VM ID as well as the resource domain (that can map to an admin partition) that the VM and VFP will be associated with is known at the VFP creation time.

In accordance with an embodiment, once defined, the VFP with all associated information is pushed to the relevant set of Subnet Managers in the IB subnet and is maintained persistently for each such SM.

In accordance with an embodiment, the VFP can now be deployed and redeployed independently of which SM is currently the master. The only information needed on the host (hypervisor) side in order get the vHCA(s) configured correctly is the VM ID.

In accordance with an embodiment, the VM ID is used in an in band request to the master SM, and if accepted, the relevant vHCA port will be configured according to the VFP specification by the master SM.

In accordance with an embodiment, the complete port configuration can either be received as a response to the request to validate the VM ID and be configured by local HCA firmware before the vHCA port is transitioned from "Down" to "Initialize" state, or a positive response to the VM ID validation request will imply that the vHCA port is transitioned from "Down" to "Initialize" state, and then the relevant information is set up by the Master SM using standard SMA attributes.

In accordance with an embodiment, in the latter case a critical issue is to what extent the vHCA port has a defined PortGUID or not when the port is transitioned from "Down" to "Initialize" state. —In order to use standard SM methods for discovering and configuring the vHCA port, it has to have a well-defined PortGUID when the port state transitions from "Down" to "Initialize".

In accordance with an embodiment, this implies that either at least the relevant VM specific GUID has been received and been set up as PortGUID before the port state transition takes place, or the relevant HW specific GUID value is used as PortGUID, and any VM specific GUID is then set up as an Alias GUID for the vHCA port. (The latter has so far been the POR for the VFP based configuration scheme.)

Figure 14:
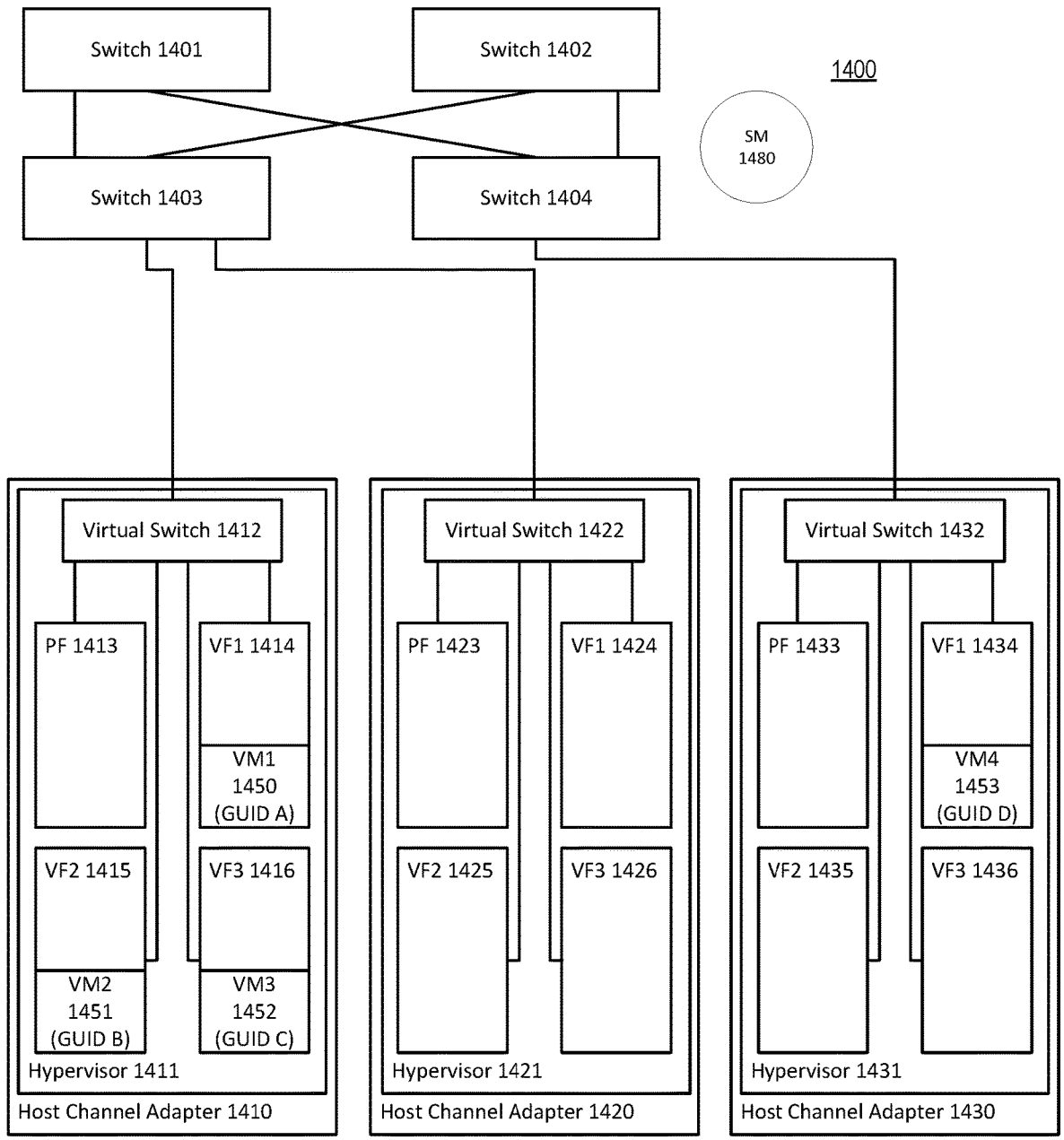
FIG. 14 illustrates is a system for fabric level verification of host defined port GUIDs in a high performance computing network, in accordance with an embodiment.

FIG. 14 is a system for fabric level verification of host defined port GUIDs in a high performance computing network, in accordance with an embodiment.

More particularly, FIG. 14 shows an exemplary vSwitch architecture, in accordance with an embodiment. As depicted in the figure, a number of switches 1401-1404 can provide communication within the network switched environment 1400 (e.g., an IB subnet) between members of a fabric, such as an InfiniBand fabric. A subnet manager 1480 can be supported within the fabric as well, and can be hosted at any of the illustrated switches, or other nodes (e.g., switches) of the fabric that are not shown in the figure. The fabric can include a number of hardware devices, such as host channel adapters 1410, 1420, 1430. Each of the host channel adapters can in turn interact with a hypervisor 1411, 1421, and 1431, respectively. Each hypervisor can, in turn, in conjunction with the host channel adapter it interacts with, setup and assign a number of virtual functions 1414, 1415, 1416, 1424, 1425, 1426, 1434, 1435, 1436, to a number of virtual machines. For example, virtual machine 1 1450 can be assigned by the hypervisor 1411 to virtual function 1 1414. Hypervisor 1411 can additionally assign virtual machine 2 1451 to virtual function 2 1415, and virtual machine 3 1452 to virtual function 3 1416. Hypervisor 1431 can, in turn, assign virtual machine 4 1453 to virtual function 1 1434. The hypervisors can access the host channel adapters through a fully featured physical function 1413, 1423, 1433, on each of the host channel adapters.

In accordance with an embodiment, each virtual machine can be associated with a virtual machine ID, which can be associated, via a VM Fabric Profile with a range of GUIDs. Each of the ranges of GUIDs can, in turn, be associated with one or more partition memberships.

In accordance with an embodiment, the VFP itself can be global for the whole IB fabric (subnet) in the sense that it is permitted for any physical server to deploy it. Alternatively it can be associated with an "admin partition" which implies that it can only be deployed on physical HCA port instances that are already members of the relevant admin partition. The VFP can be defined and, once defined, the VFP with all associated information is pushed to the relevant set of Subnet Managers, such as SM 1480, in the fabric 1400. The VFP can be maintained and persisted for the SMs.

In accordance with an embodiment, the VM ID is used in an in band request to the master SM, and if accepted, the relevant vHCA port will be configured according to the VFP specification by the master SM.

In accordance with an embodiment, for example, the virtual machine of VM1 1414 can be associated, within the VFP, with a range of GUIDs that includes GUID A. As such, upon an in band request to the SM 1480, a response can contain a range of GUIDs comprising GUID A (as well as others). GUID A can then be assigned to VM1, where GUID A is associated with one or more partition memberships.

In accordance with an embodiment, similar operations can be performed for the additional virtual machines, based upon their VM IDs. For example, on request for VM2, having its own VM ID, the Subnet Manager can respond with a range of GUIDs to be assigned to VM 2, the range comprising GUID B. Then GUID B can be assigned to VM2, wherein GUID B is associated with one or more partition memberships.

The Host based vGUID Range Assignment (HGRA) Scheme:

In accordance with an embodiment, a host based vGUID Range Assignment scheme implies that VM specific GUIDs can be associated with provisioned vHCAs, but without the central control of the set of VMs and associated GUIDs, partition membership and other fabric resources that can be active within the IB fabric that the VFP based scheme provides.

In accordance with an embodiment, instead, the HGRA scheme implies that the VM management infrastructure is able to keep track of a range of system wide unique GUIDs that is persistently associated with a VM and that is provided as explicit input to the vHCA allocation and setup function that takes place in hyper-privileged context.

In accordance with an embodiment, with the HGRA scheme, partition membership can be associated with the VM specific GUIDs in the same way as for the legacy schemes with HW specific GUIDs. Also, firewall rules and virtual 10 resources can be set up persistently for the relevant VM specific GUIDs.

In accordance with an embodiment, the HGRA scheme can provide VM specific GUIDs prior to VM deployment without any need to do any reconfiguration based on where the VM will be deployed and re-deployed. Hence, the net effect is the same as with the VFP scheme, but there is less central coordination of consistency and more hyper-privileged meta-state is needed for the VM locally in order for it to be provisioned on a physical server and be assigned one or more vHCA instances.

In accordance with an embodiment, in one scheme, the vHCA is configured locally with the relevant VM specific GUIDs as PortGUIDs before the vHCA port is "made visible" to the Master SM by transitioning the state of the link between the vSwitch and the vHCA port from "Down" to "Initialize". The Master SM will then discover the vHCA port as normal and apply any partition policy defined for the relevant PortGUID before setting the vHCA portstate to "Active".

In accordance with an embodiment, one issue is the integrity of the GUID value that is set up as PortGUID for the vHCA port. Since in this case the GUID value is supplied by local software on the host as opposed to be defined by the fabric level configuration information in the VFP case (or defined by the local HCA HW state that is only available to the HCA firmware in the case of HW specific GUID based configuration).

In accordance with an embodiment, the GUID integrity has two main aspects:
 Does the GUID represent a unique PortGUID in the local IB subnet?
 Is the GUID allowed to be used for this particular HCA/server?

In accordance with an embodiment, the first aspect implies that a Master SM is able to perform the relevant check as part of the discovery process and refuse to make the vHCA port Active if the check fails. This is in principle a generic check that applies to any discovered PortGUID and implies that both mistakes in the management of VM specific GUID ranges as well as manufacturing/configuration issues for new HW components will be detected before any negative impact on an already operational IB subnet will take place.

In accordance with an embodiment, the second aspect implies both a multi-tenancy constraint where different tenants or different administrative domains are ensured that no spoofing of VM identity from another domain or tenant can take place (due to either mistake or malicious intent), as well as an insurance that no admin mistake or malicious action within a single domain can cause conflicts with any HW specific GUID that is either currently in the system or that will be introduced at a later point in time.

In accordance with an embodiment, the mechanism for achieving the above checks is that the Master SM will have configuration policy along with the partition configuration policy that defines the legal range(es) for vGUIDs. In the minimal case, a single range is defined for the whole subnet, but in a more advanced case, different ranges are defined and associated with different admin partitions. Hence, just like in the VFP case, the physical HCA membership in an admin partition defines if a vGUID range associated with that admin partition can be used by any vHCA port associated with the physical HCA.

In accordance with an embodiment, in the case of split-brain within the VM management system (i.e., within a single tenant/resource-domain)—or other problems or mistakes leading to that the same VM and/or the same VM specific GUID is attempted operated on different servers and/or vHCAs at the same time, the generic PortGUID uniqueness check performed by the Master SM will by default ensure a "first come, first served" policy where the second attempt to activate the same vHCA configuration will fail. This will be handled without any non-standard SMA attributes for the vHCA port.

In accordance with an embodiment, however, based on use of additional Vendor Specific SMA attributes it will be possible to provide the same explicit control of which VM instance should survive as has been outlined for the VFP case. (i.e. using "incarnation number" etc.)

Figure 15:
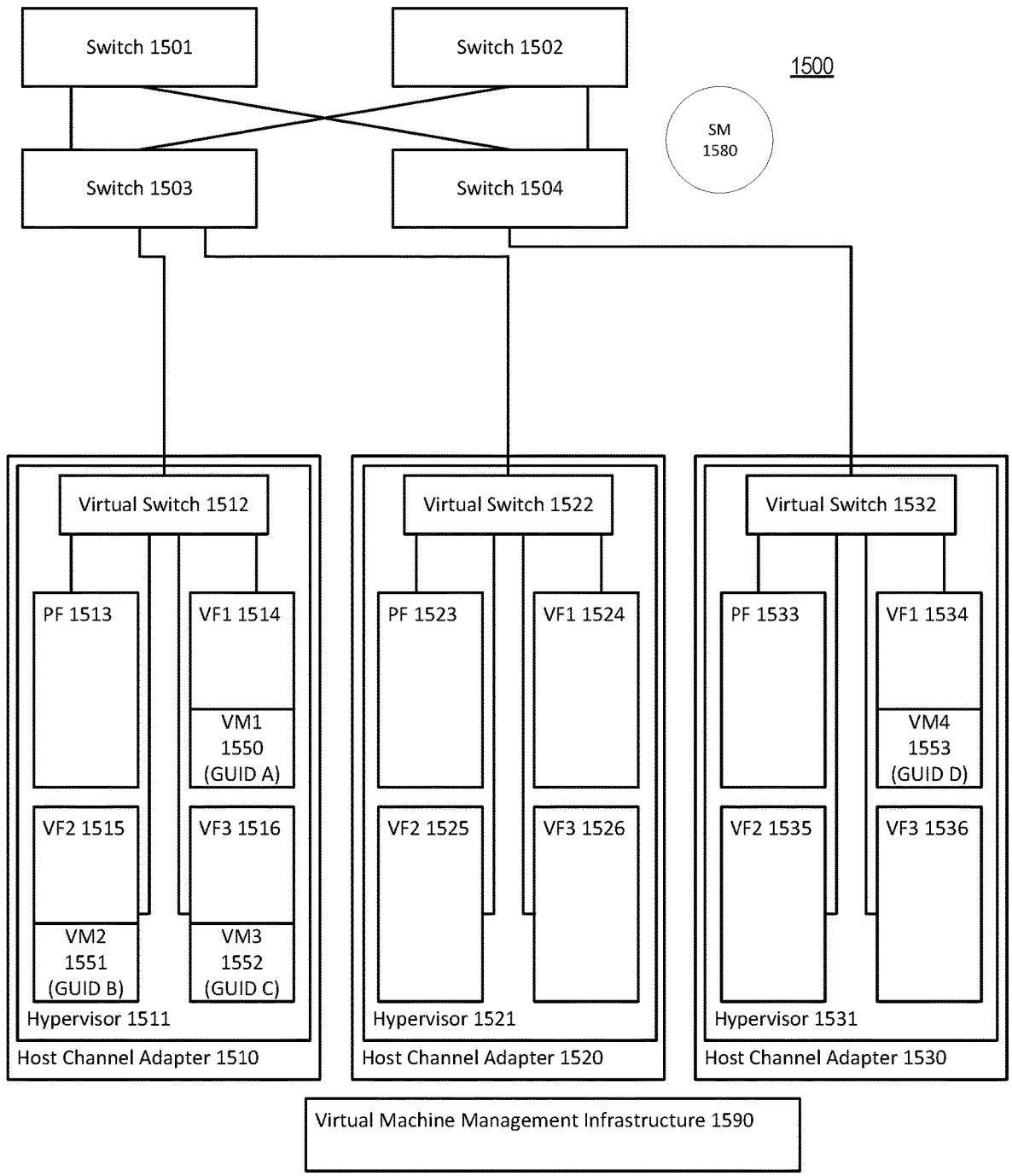
FIG. 15 illustrates is a system for fabric level verification of host defined port GUIDs in a high performance computing network, in accordance with an embodiment.

FIG. 15 is a system for fabric level verification of host defined port GUIDs in a high performance computing network, in accordance with an embodiment.

More particularly, FIG. 15 shows an exemplary vSwitch architecture, in accordance with an embodiment. As depicted in the figure, a number of switches 1501-1504 can provide communication within the network switched environment 1500 (e.g., an IB subnet) between members of a fabric, such as an InfiniBand fabric. A subnet manager 1580 can be supported within the fabric as well, and can be hosted at any of the illustrated switches, or other nodes (e.g., switches) of the fabric that are not shown in the figure. The fabric can include a number of hardware devices, such as host channel adapters 1510, 1520, 1530. Each of the host channel adapters can in turn interact with a hypervisor 1511, 1521, and 1531, respectively. Each hypervisor can, in turn, in conjunction with the host channel adapter it interacts with, setup and assign a number of virtual functions 1514, 1515, 1516, 1524, 1525, 1526, 1534, 1535, 1536, to a number of virtual machines. For example, virtual machine 1 1550 can be assigned by the hypervisor 1511 to virtual function 1 1514. Hypervisor 1511 can additionally assign virtual machine 2 1551 to virtual function 2 1515, and virtual machine 3 1552 to virtual function 3 1516. Hypervisor 1531 can, in turn, assign virtual machine 4 1553 to virtual function 1 1534. The hypervisors can access the host channel adapters through a fully featured physical function 1513, 1523, 1533, on each of the host channel adapters. A virtual machine management infrastructure 1590 can also be provided.

In accordance with an embodiment, a Host Based vGUID Range Assignment (HGRA) scheme can be implemented within the virtual machine management infrastructure 1590 in such as system. In such an environment, the HGRA scheme can provide each virtual machine with specific GUIDs, from a range of GUIDs associated with each virtual machine, prior to the VM being deployed (or re-deployed).

In accordance with an embodiment, partition membership (on a per-virtual machine basis) can be associated with the VM specific GUIDs in the same way as for the legacy schemes with HW specific GUIDs.

In accordance with an embodiment, and unlike the VFP scheme described above, because the HGRA scheme associates each VM with a range of GUIDs (or vGUIDs), then each HCA (or vHCA) can have its ports pre-populated with the relevant GUIDs prior to the HCA or vHCA being "active" in view of the subnet manager (i.e., prior to discovery). In this way, each GUID can be discovered by the SM on an initial sweep, and partition membership can be set up accordingly.

In accordance with an embodiment, for example, the virtual machine of VM1 1514 can be associated, within the HGRA, with a range of GUIDs that includes GUID A. As such, attaching VM 1 to VF1, the HCA or vHCA that connects with VF1 can assign GUID A to the port associated with VF1.

In accordance with an embodiment, similar operations can be performed for the additional virtual machines, based upon their VM IDs. For example, on request for VM2 can be associated, within the HGRA, with a range of GUIDs that includes GUID B. As such, attaching VM 2 to VF2, the HCA or vHCA that connects with VF2 can assign GUID B to the port associated with VF2.

Implementing VM Specific GUIDs for the vPort Based vHCA Model:

In accordance with an embodiment, as outlined above, the vPort based vHCA model is conceptually very similar to the vSwitch based model and the same management schemes can be applied.

In accordance with an embodiment, both the VFP scheme and HGRA scheme can be implemented in a straightforward way without any difference in configuration policy on the fabric side, nor in terms of metadata or management operations on the host/HCA side.

In accordance with an embodiment, however, as pointed out before, the low level SMA operations for performing the actual vHCA port configuration from a Master SM will be different when using IBTA standard mechanisms and attributes. (With use of non-standard mechanisms, the implementation could be made identical for both vSwitch and vPort based vHCAs.)

In accordance with an embodiment, a vSwitch and vHCA infrastructure can be implemented with full vendor control of both software and firmware. Hence, vendor specific SMA Attributes can be used as well as special UD based (non SMP) protocols between HCA embedded firmware and the VIMM.

In accordance with an embodiment, in order to use the VFP scheme for a vPort based vHCA implementation where access to (or direct influence on) a vendor controlled firmware/SMA implementation does not exist, a slightly modified UD protocol between a driver extension context (or a daemon) in the hyper-privileged Dom0/Control Domain and a VIMM extension would be needed.

In accordance with an embodiment, as long as VM specific GUIDs are to be used for PortGUIDs in either a VFP or HGRA based management scheme, there is a requirement that the vPort based vHCA implementation provides an interface that allows a hyper-privileged management component to define the PortGUID for vPort based vHCA ports before such ports are made visible to the Subnet Manager. —This scheme is in-line with the intentions of the draft IBTA specification and should not represent any problem.

Implementing VM Specific GUIDs for the Shared Port Based vHCA Model:

In accordance with an embodiment, unlike the vPort model, the Shared Port based vHCA model does not lend itself naturally to be managed using the same VFP or HGRA based management model as used for the vSwitch model.

In accordance with an embodiment, still, given some basic constraints on the vHCA configuration, it is possible to define Subnet Manager enhancements that would allow both HGRA and VFP based management of Shared Port based vHCAs.

In accordance with an embodiment, as outlined above, the SM does not see independent vHCA ports with their own P_Key and GUID tables. Instead, the physical HCA port P_Key and GUID tables are shared between the defined vHCAs in a way that is inherently transparent to the SM.

In accordance with an embodiment, in order to make the SM able to relate to individual vHCA instances behind a Shared Port, one possible scheme would be to define a mapping from a vHCA number to a sub section of the GUID table and the P_Key table of the physical port.

In accordance with an embodiment, the SM would then deal with these table sections from the shared tables as being equivalent to the vHCA private tables defined by the vSwitch and vPort models.

In accordance with an embodiment, however, the above model is not straight forward for two reasons. First, the SM does not have access to any explicit information about when a vHCA instance is defined or not. Second, if two vHCAs have some partition membership in common, then it is wasteful to allocate two entries for the same P_Key in the physical P_Key table. Also, the HW behavior when two identical P_Key values exists at the same time in the table may not be well defined, and may be prevented by the SMA implementation.

In accordance with an embodiment, the first issue can be resolved by defining the presence of a non-zero value in a GUID table entry as the indication of the vHCA port being defined. Since this inherently represents an alias GUID, the standard way to set it up would be via an SA request.

In accordance with an embodiment, a scheme can be defined where a local SMA can set up alias GUIDs autonomously in order to mimic the same behavior as with the vSwitch and vPort based handling of vHCA port PortGUID values. However, this would represent a significant amount of new logic on both the HCA firmware and driver side as well as for the SM—including mechanisms for signaling additions and removal of such GUIDs to the SM. The required signaling would in essence represent the same scheme as the current for registering and removing alias GUIDs via SA requests, hence more complexity and hardly any value-add at all.

In accordance with an embodiment, the second issue could be addressed by providing an enhanced SMA implementation that, in essence, provides that different sections in the P_Key table can contain the same P_Key values. The SMA implementation would then ensure that only one instance would get set up in hardware, and maintain this entry as long as at least one "vHCA port specific section" contains this value. However, again, this would represent significant new logic at both the HCA SMA/firmware side as well as on the SM side and without much value-add.

In accordance with an embodiment, a better scheme would be to enhance the SM to be able to handle Shared Port based alias GUIDs in the same way as vGUID based port GUIDs in the HGRA management scheme. This implies that SA setup requests for alias GUID(s) would be checked in the same way as the checking of PortGUIDs against legal vGUID value ranges. Either globally for the subnet or domain/tenant specific based on admin partition association.

In accordance with an embodiment, further, like with the HGRA scheme for vSwitch based vHCAs, the SM level partition policy would include partition membership for vGUIDs that can be associated with any type of vHCA port (i.e. Shared Port, vSwitch or vPort based).

In accordance with an embodiment, whenever a vGUID has been accepted as a legal alias GUID for a HCA port, the SM would consult its partition configuration policy and would then set up partition membership defined for this vGUID that is not already set up in the partition table of the relevant HCA port.

In accordance with an embodiment, whenever an alias GUID is removed from the HCA port GUID table, the SM can consult its partition configuration policy and then remove any P_Key table entries with P_Key values that are no longer defined for any GUID associated with the relevant HCA port.

In accordance with an embodiment, in this way, the Shared Port based vHCAs can be managed in exactly the same way as vSwitch or vPort based vHCAs, and VMs with the same meta data could in principle be migrated between or restarted on servers with any of the three types of vHCA implementations without any update of configuration policy either at fabric level or in terms of hyper privileged VM meta data.

In accordance with an embodiment, if desired, the SM could enforce a max number of partitions that can be defined for any individual vGUID. E.g. if this limit is set to 8, then it would be possible to guarantee that any VM could be deployed on a server with a Shared Port type HCA as long as no more than 16 VMs in total are present and sharing the same HCA. (In the case of vSwitch based HCA, the max number of VMs per HCA would be 32.)

In accordance with an embodiment, an alternative that takes into account that P_Key entries can be shared in the case of the Shared Port model is to say that at the time of deployment, a VM can only have up to 8 private P_Keys not shared by any others but could have more if shared. However, this logic would then depend on the order in which VMs are provisioned and could lead to strange error scenarios.

In accordance with an embodiment, a better scheme would be to leave it up to the VM management system to keep track of the server specific constraints in terms of P_Key table size, but ensure that the SM would fail a request to set up an alias GUID if the partition policy defined for the relevant vGUID could not be set up in the P_Key table at the time of deployment.

In accordance with an embodiment, a VFP based scheme could also be used for the Shared Port based HCAs. In this case, the request to associate the VM ID with a specific vHCA instance would need to also specify the vGUID entry (entries) that the VM specific GUID(s) should occupy. The SM would then handle the alias GUID setup for the physical HCA port in the same way as with the SA request based scheme (i.e. used by both the legacy Shared Port handling scheme as well as by the HGRA based handling of the Share Port based vHCAs).

In accordance with an embodiment, the partition setup by the SM would be exactly the same as in the HGRA case, and the VM ID registration request would fail if the defined set of partitions in the VFP could not be set up for the physical port P_Key table.

Extending and Optimizing the HGRA Management Scheme:

In accordance with an embodiment, the HGRA scheme assumes that either a single admin authority is in charge of all servers in the subnet, or that a single admin authority is in charge of defining admin partitions as well as ensuring that all partition associations with GUIDs are reflecting the correct tenant/domain associations. (I.e. a GUID can only be associated with partitions that the relevant domain/tenant has access to. Same issue as when constructing VFPs.)

In accordance with an embodiment, still, all VM creations implies that the relevant set of partition memberships are defined for all GUIDs associated with the VM.

In accordance with an embodiment, one optimization is to introduce the notion of a vGUID range associated specifically with the whole set of partitions the VM is supposed to access so that the membership does not have to be repeated for all the GUIDs the VM represents.

In accordance with an embodiment, however, this scheme implies that it becomes more difficult to manage cases where different vHCAs associated with the same VM represents different partition membership.

In accordance with an embodiment, a better scheme that reduces the overhead associated with having to set up partition membership for each VM as part of VM creation (and modify this later if needed), is to leverage the "on-demand" scheme for partition setup. In this scheme, data partitions are associated with admin partitions. A physical HCA port (i.e. the hyper-privileged management component controlling it) is allowed to dynamically request partition membership to be set up for the physical port (or for vHCA ports associated with the physical port), as long as these partitions are legal for the admin partition that the physical HCA port is associated with.

In accordance with an embodiment, this scheme implies that as long as admin partition, vGUID ranges and data partitions are defined up front, there is never any need to do dynamic fabric configuration policy updates at a VM lifecycle event.

In accordance with an embodiment, also, as long as the Shared Port model implies that the hyper privileged VM Meta Data includes specification of which partitions (P_Key values) the VM should be set up with, then the necessary information for implementing "on-demand" partition setup exists.

In accordance with an embodiment, in this case, the hyper-privileged management function could optimize vHCA provisioning by only requesting on-demand partition updates when needed. The on-demand partition setup request could be associated with a GUID or be independent of GUIDs associated with the port.

SM Failover/Startup and Re-Discovery of Already Operational Subnet Configuration:

In accordance with an embodiment, in the case of a "subnet cold start" where all ports/links have trained but never been put in Active state, the legacy master SM will perform discovery and will initialize the visible ports according to current policy.

In accordance with an embodiment, similarly any new ports discovered/added after the initial subnet cold start will be initialized according to current policy.

In accordance with an embodiment, in the case of vHCA ports, the initial setup and initialization would take place according to the various models described above.

In accordance with an embodiment, however, if a master SM failover, handover or restart happens when the whole IB subnet or parts of the subnet is already fully operational (i.e. with both physical HCAs and vHCAs with ports in Active state), then there are several issues that must be addressed.

In accordance with an embodiment, by default, legacy OpenSM can discover HCA ports in Active state and will then make sure that current partition setup for the HCA port is in accordance with the currently defined SM policy for the relevant port. Also, LID(s) already assigned to the (v)HCA port will be preserved as long as there is not a conflict with other already assigned LIDs (i.e. as a result of some kind of subnet merge).

In accordance with an embodiment, any configuration information that the host stack controlling the (v)HCA has established via SA requests including MCG membership, Service Registrations, Event Notification Registrations and Alias GUIDs can be explicitly "re-requested" to the new master SA (SM) when the new master SM has signaled its presences by triggering the client-reregister event for the (v)HCA port.

In accordance with an embodiment, in addition, any path records or any other dynamically retrieved SA-based information may need to be "refreshed" after a client-reregister event.

In accordance with an embodiment, the legacy handling described above does also cover both vSwitch based vHCAs when HW specific GUIDs are used as well as the Shared Port model with both vGUID and HW specific GUID based Alias GUID setup for the vHCAs as long as partition configuration is based on policy defined for the physical HCA port HW specific GUID.

Handling of VFP Based Active vSwitch Type vHCA Ports:

In accordance with an embodiment, in a situation where handling of VFP based active vSwitch type vHCA ports, the SM can discover that the vHCA port is in "VFP mode" via a special SMA attribute. The SM will then fetch a VFP "signature" attribute that can be correlated with current policy at the SM/VIMM side.

In accordance with an embodiment, if the "VFP signature" matches the current policy and no conflicting VFP registration exists in the subnet, then no further action is needed.

In accordance with an embodiment, if the "VFP signature" does not match the current policy, then an update of the vHCA port configuration will be performed.

In accordance with an embodiment, if the "VFP signature" indicates a VFP that is no longer valid with the current policy, then the vHCA port will be shut down, and the VIMM will notify the VIMM Agent (VIMMA) on the HCA side that the registration is invalid and that the vHCA should remain not operational until a new successful registration has been completed, or the mode of vHCA has been modified.

In accordance with an embodiment, if there already is a conflicting VFP registration, then the VIMM will decide which one is the "winner" (e.g. based on the "incarnation number" of the VFP registrations), and then inform the "looser" about the decision. —The "loosing" vHCA will then be shut down.

Handling of VFP Based Active vPort Type vHCA Ports:

In accordance with an embodiment, the handling of VFP based active vPort type vHCA ports is in principle exactly the same as in the vSwitch case. —The difference may be to what extent the HCA side implementation supports the special SMA attributes. If such SMA attributes are not supported, then the SM will have to decide that the vHCA port (vPort) has an active VFP configuration based on matching the PortGUID against relevant vGUID ranges for any admin partition associated with the physical HCA port, as well as checking if any defined VFP specifies the relevant PortGUID.

In accordance with an embodiment, additionally, the VIMM may also inquire the relevant host based VIMMA (assuming a VIMMA implementation in the hyperprivileged domain and not as part of the HCA firmware). Based on this inquiry, the VIMM would be able to explicitly determine the current state of a VFP registration in the same way as could be achieved via the "VFP signature" SMA attribute in the vSwitch case.

Handling of VFP Based Active Shared Port Type vHCAs:

In accordance with an embodiment, as described above, by default, no Alias GUID is discovered by the SM in a situation of handling of VFP based active shared port type vHCAs.

In accordance with an embodiment, Alias GUIDs are setup by the SM based on explicit SA requests for assigning the Alias GUID at a specific index in the GUID table of the physical HCA port.

In accordance with an embodiment, in the case of VFP configuration, the SA request is replaced by the VFP registration request that will then also include the GUID table index for the relevant VFP defined vGUID.

In accordance with an embodiment, in the case of client-registration events, the same (re)registration procedure should be used for the VFP. Hence, both the legacy SA request based scheme and the VPF based scheme would use the same structure with explicit registration and re-registration requests.

In accordance with an embodiment, in the VFP based case, the same consistency checks and status feedback would take place for both initial registrations as well as re-registrations.

In accordance with an embodiment, in the case of a failed registration, the effect would be that no Alias GUID and no additional partition membership for the physical HCA port would be set up, the failure of a re-registration operation would imply that the relevant existing Alias GUID would be removed, and also that partition membership that is exclusive for the relevant VFP/vGUID would be removed from the physical port.

In accordance with an embodiment, a key difference from the legacy case where partition membership is defined explicitly for the physical port HW GUID is that a VFP based scheme would be more dependent on the re-registration operations taking place in due time in order to preserve the consistency of the physical port configuration over time.

In accordance with an embodiment, for this reason, explicit discovery operation can be added where the SM would explicitly fetch the Alias GUIDs currently set up for a physical HCA port, and "clean up" any Alias GUIDs and partition membership that is not in synch with the current SM configuration policy. —This would be in addition to and would not replace explicit re-registration operations initiated from the hyper-privileged domain controlling the physical HCA.

Handling of HGRA Based Active vSwitch Type vHCA Ports:

In accordance with an embodiment, the SM can determine that HGRA based vHCA ports are correctly configured based on performing the same vGUID range based checking when discovering PortGUIDs for ports that are already in Active state, as in the case of initialize state and initial setup of the vHCA port.

In accordance with an embodiment, if the PortGUID represents a legal vGUID with a defined partition policy, then the SM will ensure that the vHCA port P_Key table is in synch with the current policy.

In accordance with an embodiment, if no such policy exists, then the vHCA port should no longer be active and will be reset to initialize state.

In accordance with an embodiment, if there is a vGUID registration conflict with another already registered vGUID, then the conflict will be resolved in the same way as for initial vHCA startup, but the handling of the conflict will be different in the sense that the "looser" will be brought down to initialize state instead of just not being activated.

In accordance with an embodiment, in the case where the same SM supports both VPF and HGRA based vHCA configuration, the difference can be sorted out based on to what extent a VFP exists for the discovered PortGUID as well as based on the special SMA attributes described for the VFP case above.

Handling of HGRA Based Active vPort type vHCA Ports:

In accordance with an embodiment, the handling of vPort based vHCAs is in principle exactly the same as the vSwitch based handling. The only difference is to what extent any special SMA attributes are defined for the physical HCA port in this case.

In accordance with an embodiment, as long as no such special SMA attributes are defined, the handling will be purely based on the checking that the discovered PortGUID is legal in terms of vGUID value range and admin partition association.

In accordance with an embodiment, conflicting GUIDs will be handled based on first come first serve as long as no special SMA attributes or VIMM protocol is supported for handling incarnation numbers or other additional control information.

Handling of HGRA Based Active Shared Port Type vHCAs:

In accordance with an embodiment, this is in principle exactly the same scheme as the VFP case, but registration and re-registration of Alias GUIDs is based on SA access rather than VIMM/VFP registration protocol.

In accordance with an embodiment, also, as with the vPort based case, any conflicts will be handled in a first come first served manner as long as no special SMA, attributes, SA requests or VIMM protocol is supported.

Figure 16:
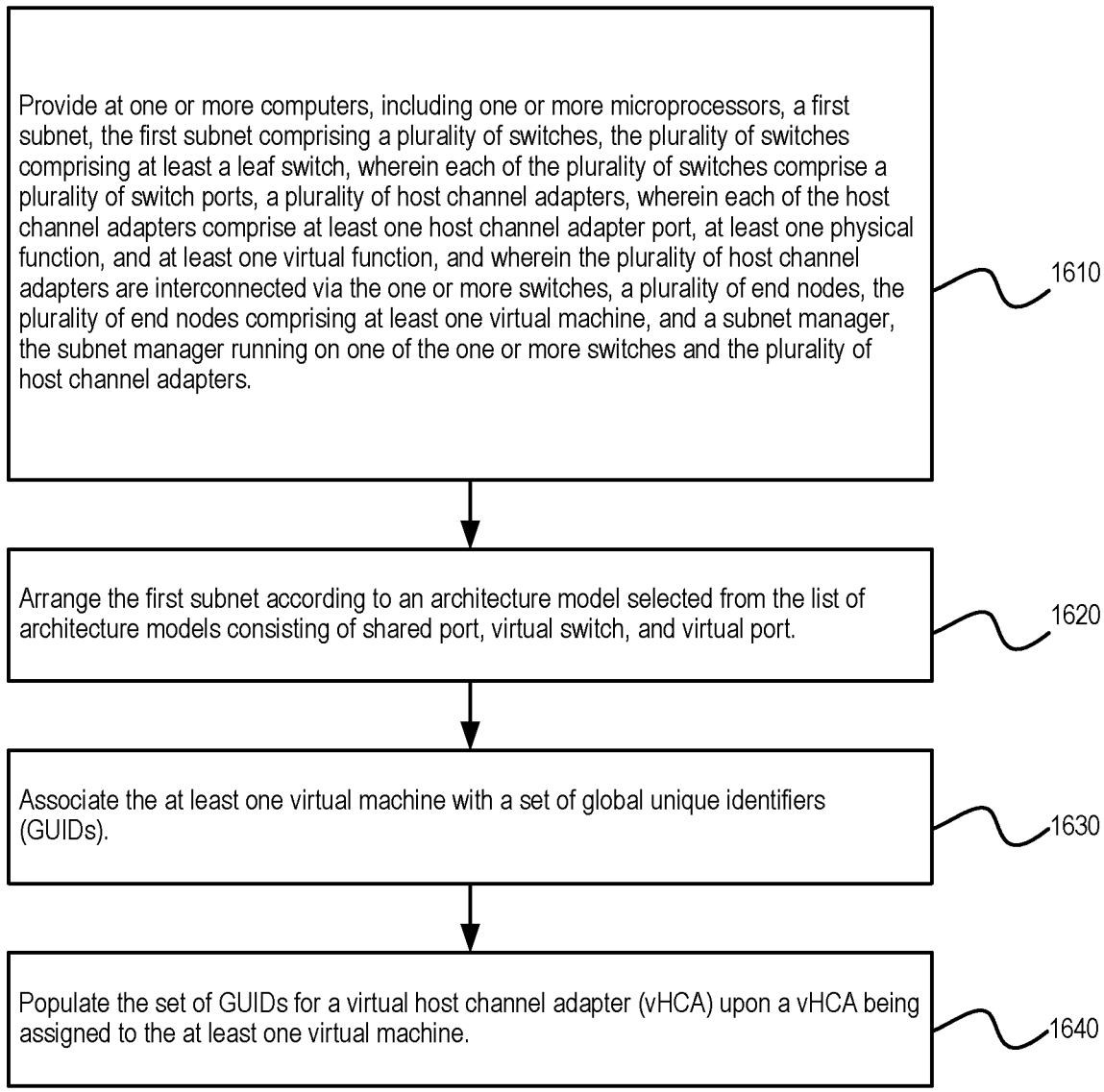
FIG. 16 is a flowchart of a method fabric level verification of host defined port GUIDs in a high performance computing network, in accordance with an embodiment.

FIG. 16 is a flowchart of a method for fabric level verification of host defined port GUIDs in a high performance computing network, in accordance with an embodiment.

At step 1610, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, wherein each of the host channel adapters comprise at least one host channel adapter port, at least one physical function, and at least one virtual function, and wherein the plurality of host channel adapters are interconnected via the one or more switches, a plurality of end nodes, the plurality of end nodes comprising at least one virtual machine, and a subnet manager, the subnet manager running on one of the one or more switches and the plurality of host channel adapters.

At step 1620, the method can arrange the first subnet according to an architecture model selected from the list of architecture models consisting of shared port, virtual switch, and virtual port.

At step 1630, the method can associate the at least one virtual machine with a set of global unique identifiers (GUIDs).

At step 1640, the method can populate the set of GUIDS for a virtual host channel adapter (vHCA) upon a vHCA being assigned to the at least one virtual machine.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for fabric level verification of host defined port global unique identifiers (GUIDs) in a high performance computing network, comprising:
   one or more microprocessors;
   a first subnet, the first subnet comprising
      a plurality of switches,
      a plurality of host channel adapters (HCAs), wherein each of the host channel adapters comprise at least one host channel adapter port, at least one physical function, and at least one virtual function, and wherein the plurality of host channel adapters are interconnected via the plurality of switches,
      a plurality of end nodes, the plurality of end nodes comprising at least one virtual machine, and
      a subnet manager, the subnet manager running on one of the plurality of switches and the plurality of host channel adapters, the subnet manager being associated with a virtual machine fabric profile;
   wherein the first subnet is arranged according to an architecture model selected from the list of architecture models consisting of shared port, virtual switch, and virtual port;
   wherein the at least one virtual machine is associated with a plurality of GUIDs and a partition of a plurality of partitions, wherein said association of the at least one virtual machine with the plurality of GUIDs is defined within the virtual machine fabric profile, and wherein said association of the at least one virtual machine with the partition of the plurality of partitions is defined within the virtual machine fabric profile;
   wherein the subnet manger receives, in response to an assignment of the at least one virtual machine upon to a virtual host channel adapter, a request from a host channel adapter comprising the vHCA, the request comprising a validation check of the at least one virtual machine virtual host channel adapter; and
   wherein the subnet manger validates the at least one virtual machine with respect to the virtual machine fabric profile, and upon such validation, a port associated with the vHCA is initialized in accordance with the virtual machine fabric profile.

2. The system of claim 1, wherein upon validating the at least one virtual machine, the subnet manager sends to the vHCA that the at least one virtual machine is assigned to, the set of GUIDs associated with the at least one virtual machine.

3. The system of claim 2, wherein each of the plurality of GUIDs associated with the at least one virtual machine are associated with one or more partitions.

4. The system of claim 1, wherein the at least one virtual machine is associated with a set of GUIDs within Host based vGUID Range Assignment (HGRA), the HGRA being hosted at a virtual machine management infrastructure associated with the first subnet.

5. The system of claim 4, wherein upon the at least one virtual machine attaching to the at least one virtual function of a HCA of the plurality of HCAs, a port of the vHCA to which the at least one virtual function is attached is assigned a GUID within the set of GUIDs from the HGRA.

6. The system of claim 5, wherein the first subnet comprises an InfiniBand subnet.

7. A method for fabric level verification of host defined port global unique identifiers (GUIDs) in a high performance computing network, comprising:
   providing, at one or more computers, including one or more microprocessors
      a first subnet, the first subnet comprising
      a plurality of switches,
      a plurality of host channel adapters, wherein each of the host channel adapters comprise at least one host channel adapter port, at least one physical function, and at least one virtual function, and wherein the plurality of host channel adapters are interconnected via the plurality of switches,
      a plurality of end nodes, the plurality of end nodes comprising at least one virtual machine, and
      a subnet manager, the subnet manager running on one of the plurality of switches and the plurality of host channel adapters, the subnet manager being associated with a virtual machine fabric profile;
   arranging the first subnet according to an architecture model selected from the list of architecture models consisting of shared port, virtual switch, and virtual port;
   associating the at least one virtual machine with a plurality of GUIDs and a partition of a plurality of partitions, wherein said association of the at least one virtual machine with the plurality of GUIDs is defined within the virtual machine fabric profile, and wherein said association of the at least one virtual machine with the partition of the plurality of partitions is defined within the virtual machine fabric profile;
   receiving, by the subnet manager, in response to an assignment of the at least one virtual machine upon to a virtual host channel adapter, a request from a host channel adapter comprising the vHCA, the request comprising a validation check of the at least one virtual machine virtual host channel adapter; and validating, by the subnet manager, the at least one virtual machine with respect to the virtual machine fabric profile, and upon such validation, a port associated with the vHCA is initialized in accordance with the virtual machine fabric profile.

8. The method of claim 7,
wherein upon validating the at least one virtual machine, the subnet manager sends to the vHCA that the at least one virtual machine is assigned to, the set of GUIDs associated with the at least one virtual machine.

9. The method of claim 8, wherein each of plurality of GUIDs associated with the at least one virtual machine are associated with one or more partitions.

10. The method of claim 7,
wherein the at least one virtual machine is associated with a set of GUIDs within Host based vGUID Range Assignment (HGRA), the HGRA being hosted at a virtual machine management infrastructure associated with the first subnet.

11. The method of claim 10,
wherein upon the at least one virtual machine attaching to the at least one virtual function of a HCA of the plurality of HCAs, a port of the vHCA to which the at least one virtual function is attached is assigned a GUID within the set of GUIDs from the HGRA.

12. The method of claim 11,
wherein the first subnet comprises an InfiniBand subnet.

13. A non-transitory computer readable storage medium having instructions thereon for fabric level verification of host defined port global unique identifiers (GUIDs) in a high performance computing network, which when read and executed by one or more computers cause the one or more computers to perform the steps comprising:

providing, at one or more computers, including one or more microprocessors
a first subnet, the first subnet comprising
a plurality of switches,
a plurality of host channel adapters, wherein each of the host channel adapters comprise at least one host channel adapter port, at least one physical function, and at least one virtual function, and wherein the plurality of host channel adapters are interconnected via the plurality of switches,
a plurality of end nodes, the plurality of end nodes comprising at least one virtual machine, and
a subnet manager, the subnet manager running on one of the plurality of switches and the plurality of host channel adapters, the subnet manager being associated with a virtual machine fabric profile;

arranging the first subnet according to an architecture model selected from the list of architecture models consisting of shared port, virtual switch, and virtual port;

associating the at least one virtual machine with a plurality of GUIDs and a partition of a plurality of partitions, wherein said association of the at least one virtual machine with the plurality of GUIDs is defined within the virtual machine fabric profile, and wherein said association of the at least one virtual machine with the partition of the plurality of partitions is defined within the virtual machine fabric profile;

receiving, by the subnet manager, in response to an assignment of the at least one virtual machine upon to a virtual host channel adapter, a request from a host channel adapter comprising the vHCA, the request comprising a validation check of the at least one virtual machine virtual host channel adapter; and validating, by the subnet manager, the at least one virtual machine with respect to the virtual machine fabric profile, and upon such validation, a port associated with the vHCA is initialized in accordance with the virtual machine fabric profile.

14. The non-transitory computer readable storage medium of claim 13, wherein upon validating the at least one virtual machine, the subnet manager sends to the vHCA that the at least one virtual machine is assigned to, the set of GUIDs associated with the at least one virtual machine.

15. The non-transitory computer readable storage medium of claim 14,
wherein each of the plurality of GUIDs associated with the at least one virtual machine are associated with one or more partitions.

16. The non-transitory computer readable storage medium of claim 13,
wherein the at least one virtual machine is associated with a plurality of GUIDs within Host based vGUID Range Assignment (HGRA), the HGRA being hosted at a virtual machine management infrastructure associated with the first subnet.

17. The non-transitory computer readable storage medium of claim 16,
wherein upon the at least one virtual machine attaching to the at least one virtual function of a HCA of the plurality of HCAs, a port of the vHCA to which the at least one virtual function is attached is assigned a GUID within the set of GUIDs from the HGRA.

* * * * *

UNITED STATES PATENT AND TRADEMARK OFFICE
CERTIFICATE OF CORRECTION

PATENT NO. : 10,924,432 B2
APPLICATION NO. : 15/847618
DATED : February 16, 2021
INVENTOR(S) : Johnsen et al.

Page 1 of 1

It is certified that error appears in the above-identified patent and that said Letters Patent is hereby corrected as shown below:

In the Specification

In Column 1, Line 59, delete "embodiment" and insert -- embodiment. --, therefor.

In Column 11, Line 36, delete "PF" and insert -- PF. --, therefor.

In Column 16, Line 18, delete "switching" and insert -- switching. --, therefor.

In Column 19, Line 8, delete "vPorts" and insert -- vPorts. --, therefor.

In Column 26, Line 48, delete "PortGUIDs" and insert -- PortGUIDs --, therefor.

In the Claims

In Column 34, Line 1, in Claim 1, delete "manger" and insert -- manager --, therefor.

In Column 34, Line 7, in Claim 1, delete "manger" and insert -- manager --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*